(12) United States Patent
Wenren et al.

(10) Patent No.: US 11,531,186 B2
(45) Date of Patent: Dec. 20, 2022

(54) ELECTRONIC IMAGING DEVICE COMPRISING TWO CAPTURING DEVICES

(71) Applicant: Zhejiang Sunny Optical Co., Ltd, Ningbo (CN)

(72) Inventors: Jianke Wenren, Ningbo (CN); Jia Lu, Ningbo (CN); Lin Huang, Ningbo (CN); Fujian Dai, Ningbo (CN); Liefeng Zhao, Ningbo (CN)

(73) Assignee: Zhejiang Sunny Optical Co., Ltd., Ningbo (CN)

( * ) Notice: Subject to any disclaimer, the term of this patent is extended or adjusted under 35 U.S.C. 154(b) by 323 days.

(21) Appl. No.: 16/850,096

(22) Filed: Apr. 16, 2020

(65) Prior Publication Data

US 2020/0333560 A1  Oct. 22, 2020

(30) Foreign Application Priority Data

Apr. 17, 2019 (CN) .......................... 201910307719.2

(51) Int. Cl.
*G02B 9/62* (2006.01)
*H04N 5/225* (2006.01)
*G02B 13/00* (2006.01)

(52) U.S. Cl.
CPC .......... *G02B 9/62* (2013.01); *G02B 13/0045* (2013.01); *H04N 5/2253* (2013.01); *H04N 5/2258* (2013.01)

(58) Field of Classification Search
None
See application file for complete search history.

(56) References Cited

U.S. PATENT DOCUMENTS

| | | | |
|---|---|---|---|
| 10,082,647 B1* | 9/2018 | Jhang | G02B 9/60 |
| 10,288,896 B2* | 5/2019 | Shabtay | G02B 13/02 |
| 2003/0020814 A1 | 1/2003 | Ono | |
| 2010/0182445 A1 | 7/2010 | Chiang | |
| 2016/0341934 A1* | 11/2016 | Mercado | H04N 5/2252 |
| 2017/0090155 A1* | 3/2017 | Mao | G02B 13/0035 |
| 2017/0115471 A1* | 4/2017 | Shinohara | G02B 9/62 |
| 2017/0184871 A1* | 6/2017 | Shabtay | G02B 27/0025 |

(Continued)

OTHER PUBLICATIONS

Communication dated Jun. 14, 2021 by the Indian Patent Office in application No. 202014016546.

*Primary Examiner* — Cynthia Segura
(74) *Attorney, Agent, or Firm* — Sughrue Mion, PLLC

(57) ABSTRACT

The present disclosure discloses an electronic imaging device including a first capturing device and a second capturing device. The first capturing device includes a first lens system and a first electronic photosensitive element located on an imaging plane of the first lens system. The second capturing device includes a second lens system and a second electronic photosensitive element located on an imaging plane of the second lens system. The first capturing device and the second capturing device are located at a same side of the electronic imaging device, and a field-of-view of the first capturing device is different from a field-of-view of the second capturing device. A total effective focal length $f_T$ of the first lens system and a total effective focal length $f_W$ of the second lens system satisfy $f_T/f_W > 3.3$.

19 Claims, 14 Drawing Sheets

(56) References Cited

U.S. PATENT DOCUMENTS

| | | | |
|---|---|---|---|
| 2017/0219803 A1* | 8/2017 | Lee | G02B 9/62 |
| 2018/0314038 A1* | 11/2018 | Hsieh | G02B 13/0045 |
| 2018/0314039 A1* | 11/2018 | Dai | G02B 9/62 |
| 2018/0356613 A1* | 12/2018 | Chen | G02B 7/04 |
| 2019/0302414 A1* | 10/2019 | Jhang | G02B 9/62 |
| 2019/0391366 A1* | 12/2019 | Yamazaki | G02B 13/0045 |
| 2020/0112657 A1* | 4/2020 | Stein | H04N 7/181 |
| 2020/0201003 A1* | 6/2020 | Chiang | G02B 9/60 |
| 2021/0165189 A1* | 6/2021 | Wang | G02B 9/62 |
| 2021/0318527 A1* | 10/2021 | Gao | G02B 7/04 |
| 2021/0325644 A1* | 10/2021 | Zhang | G02B 15/1441 |
| 2022/0046151 A1* | 2/2022 | Shabtay | G02B 13/0045 |
| 2022/0206257 A1* | 6/2022 | Wang | G02B 13/0045 |
| 2022/0236522 A1* | 7/2022 | Xing | G02B 3/04 |

\* cited by examiner

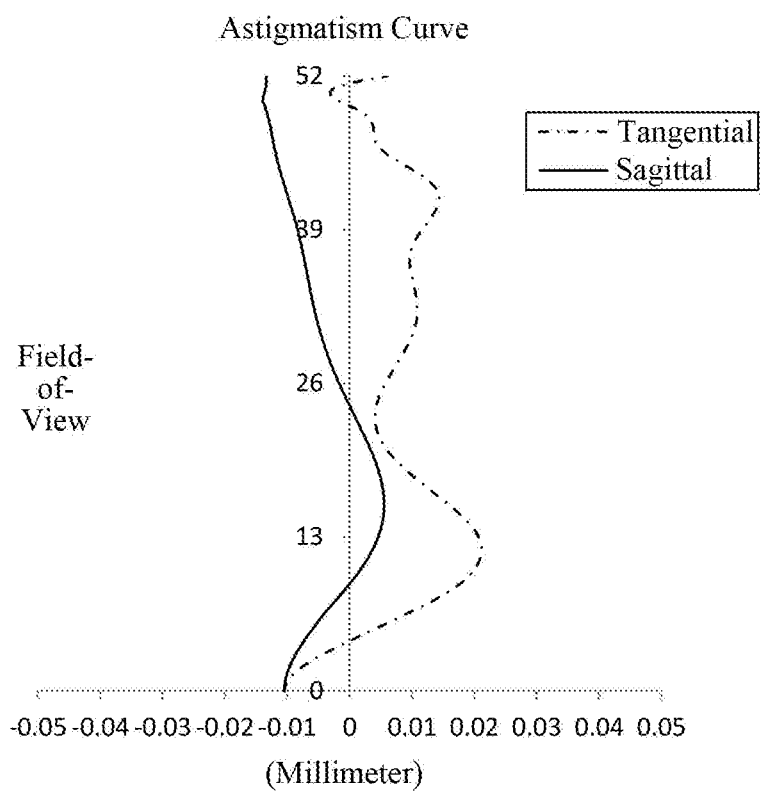
Fig. 14B
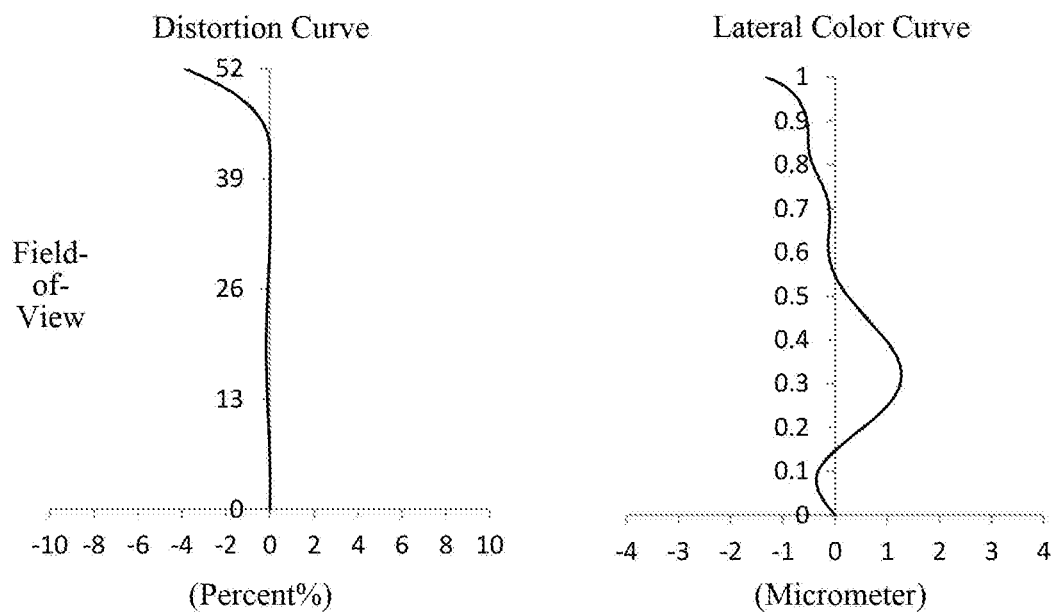
Fig. 14C
Fig. 14D

ELECTRONIC IMAGING DEVICE COMPRISING TWO CAPTURING DEVICES

CROSS-REFERENCE TO RELATED APPLICATIONS

This application claims benefit of priority to Chinese Patent Application No. 201910307719.2 filed on Apr. 17, 2019 before the China National Intellectual Property Administration, the entire disclosures of which is incorporated herein by reference in its entity.

TECHNICAL FIELD

The present disclosure relates to an electronic imaging device, and more specifically, relates to an electronic imaging device including two capturing devices.

BACKGROUND

With the continuous development of the mobile phone industry, people are increasingly relying on mobile phones, and the imaging quality requirements on mobile phone lens assemblies are becoming higher and higher. Unlike the random zoom of professional camera, such as DSLR cameras, the evolution of the optical zoom of the mobile phone lens assemblies has not been smooth. The traditional optical zoom involves mechanical movement of the lens assemblies, and this will increase the total length of the lens assembly, which undesirably contradicts the current trend of thinning the portable devices, such as mobile phones.

Therefore, how to achieve the optical zoom of the portable device, without increasing its thickness and by utilizing the current wide-angle and telephoto dual-cameras is one of the issues to be urgently solved in this field.

SUMMARY

The present disclosure provides an electronic imaging device, for example, an electronic imaging device that may enable high-quality optical zoom with dual-camera assemblies, that may at least solve or partially address at least one of the above disadvantages of the prior art.

The present disclosure provides an electronic imaging device. The electronic imaging device includes a first capturing device and a second capturing device, wherein the first capturing device may include a first lens system and a first electronic photosensitive element located on an imaging plane of the first lens system; the first lens system may include at least one lens having a refractive power, and a lens closest to an object side has a positive refractive power; the second capturing device may include a second lens system and a second electronic photosensitive element located on an imaging plane of the second lens system; the second lens system may include at least one lens having a refractive power, and a lens closest to an object side has a negative refractive power. Here, the first capturing device and the second capturing device are located at the same side of the electronic imaging device, and a field-of-view of the first capturing device is different from a field-of-view of the second capturing device.

In one embodiment, a total effective focal length $f_T$ of the first lens system and a total effective focal length $f_W$ of the second lens system may satisfy $f_T/f_W > 3.3$.

In one embodiment, half of a maximal field-of-view Semi-FOV$_T$ of the first lens system may satisfy $20° < \text{Semi-FOV}_T < 25°$.

In one embodiment, half of a maximal field-of-view Semi-FOV$_W$ of the second lens system may satisfy $50° < \text{Semi-FOV}_W < 55°$.

In one embodiment, a distance TTL$_T$ along an optical axis of the first lens system from an object-side surface of the lens closest to the object side of the first lens system to the imaging plane of the first lens system and a total effective focal length $f_T$ of the first lens system may satisfy TTL$_T$/$f_T < 0.9$.

In one embodiment, half of a diagonal length ImgH$_T$ of an effective pixel area on the imaging plane of the first lens system and a total effective focal length $f_T$ of the first lens system may satisfy ImgH$_T$/$f_T < 0.5$.

In one embodiment, a distance TTL$_W$ along an optical axis of the second lens system from an object-side surface of the lens closest to the object side of the second lens system to the imaging plane of the second lens system and half of a diagonal length ImgH$_W$ of an effective pixel area on the imaging plane of the second lens system may satisfy TTL$_W$/ImgH$_W < 1.9$.

In one embodiment, a total effective focal length $f_W$ of the second lens system and an entrance pupil aperture EPD$_W$ of the second lens system may satisfy $f_W$/EPD$_W < 2.2$.

In one embodiment, each two adjacent lenses in the first lens system has an air gap therebetween; and each two adjacent lenses in the second lens system has an air gap therebetween.

In one embodiment, the first capturing device and the second capturing device are arranged longitudinally or laterally on one side of the electronic imaging device.

In one embodiment, the first lens system may include, sequentially from the object side to the imaging plane of the first lens system along an optical axis of the first lens system, a first lens, a second lens, a third lens, a fourth lens, a fifth lens and a sixth lens. Further, an effective focal length $f2_T$ of the second lens of the first lens system, an effective focal length $f5_T$ of the fifth lens of the first lens system, and an effective focal length $f4_T$ of the fourth lens of the first lens system may satisfy $0.4 < (f2_T + f5_T)/f4_T < 0.7$.

In one embodiment, the first lens system may include, sequentially from the object side to the imaging plane of the first lens system along an optical axis of the first lens system, a first lens, a second lens, a third lens, a fourth lens, a fifth lens and a sixth lens. Further, a radius of curvature R11$_T$ of an object-side surface of the sixth lens of the first lens system and a radius of curvature R12$_T$ of an image-side surface of the sixth lens of the first lens system may satisfy $0.8 < R11_T/R12_T < 1.3$.

In one embodiment, the first lens system may include, sequentially from the object side to the imaging plane of the first lens system along an optical axis of the first lens system, a first lens, a second lens, a third lens, a fourth lens, a fifth lens and a sixth lens. Further, a combined focal length f1234$_T$ of the first lens, the second lens, the third lens, and the fourth lens of the first lens system, a radius of curvature R1$_T$ of an object-side surface of the first lens of the first lens system and a radius of curvature R2$_T$ of an image-side surface of the first lens of the first lens system may satisfy $0.3 < f1234_T/(R1_T + R2_T) < 0.6$.

In one embodiment, the first lens system may include, sequentially from the object side to the imaging plane of the first lens system along an optical axis of the first lens system, a first lens, a second lens, a third lens, a fourth lens, a fifth lens and a sixth lens. Further, the fifth lens of the first lens system has a negative refractive power, an object-side surface thereof is a concave surface, and an image-side surface thereof is a concave surface.

In one embodiment, the first lens system may include, sequentially from the object side to the imaging plane of the first lens system along an optical axis of the first lens system, a first lens, a second lens, a third lens, a fourth lens, a fifth lens and a sixth lens. Further, at least four lenses among the first lens to the sixth lens of the first lens system are lenses made of plastic material.

In one embodiment, the second lens system may include, sequentially from the object side to the imaging plane of the second lens system along an optical axis of the second lens system, a first lens, a second lens, a third lens, a fourth lens, a fifth lens and a sixth lens. Further, a total effective focal length $f_W$ of the second lens system and an effective focal length $f5_W$ of the fifth lens of the second lens system may satisfy $0.4 \leq f_W/f5_W \leq 1.8$.

In one embodiment, the second lens system may include, sequentially from the object side to the imaging plane of the second lens system along an optical axis of the second lens system, a first lens, a second lens, a third lens, a fourth lens, a fifth lens and a sixth lens. Further, a radius of curvature $R2_W$ of an image-side surface of the first lens of the second lens system and a radius of curvature $R1_W$ of an object-side surface of the first lens of the second lens system may satisfy $0.2 < R2_W/R1_W < 0.6$.

In one embodiment, the second lens system may include, sequentially from the object side to the imaging plane of the second lens system along an optical axis of the second lens system, a first lens, a second lens, a third lens, a fourth lens, a fifth lens and a sixth lens. Further, a radius of curvature $R8_W$ of an image-side surface of the fourth lens of the second lens system and a radius of curvature $R7_W$ of an object-side surface of the fourth lens of the second lens system may satisfy $0.3 < R8_W/R7_W < 1.0$.

In one embodiment, the second lens system may include, sequentially from the object side to the imaging plane of the second lens system along an optical axis of the second lens system, a first lens, a second lens, a third lens, a fourth lens, a fifth lens and a sixth lens. Further, an image-side surface of the second lens of the second lens system is a convex surface; and the fifth lens of the second lens system has a positive refractive power, an object-side surface thereof is a concave surface, and an image-side surface thereof is a convex surface.

In one embodiment, the second lens system may include, sequentially from the object side to the imaging plane of the second lens system along an optical axis of the second lens system, a first lens, a second lens, a third lens, a fourth lens, a fifth lens and a sixth lens. Further, at least four lenses among the first lens to the sixth lens of the second lens system are lenses made of plastic material.

By providing two different capturing devices in the electronic imaging device in the present application, and by rationally assigning the refractive power, the surface shape of each lens in the two capturing device, the center thickness of each lens, and the on-axis spaced interval between the lenses and the like, the above electronic imaging device has at least such advantageous effect: while ensuring the miniaturization of the electronic imaging device, the image effect of the hybrid optical zoom can be achieved by the alternate use of different image capturing modes.

BRIEF DESCRIPTION OF THE DRAWINGS

Other features, objects, and advantages of the present disclosure will become more apparent from the following detailed description of the non-limiting embodiments with reference to the accompanying drawings. In the accompanying drawings:

FIGS. 14A to 14D illustrate a longitudinal aberration curve, an astigmatic curve, a distortion curve and a lateral color curve of the second lens system of the Example 7, respectively;

DETAILED DESCRIPTION OF EMBODIMENTS

Figure 1:
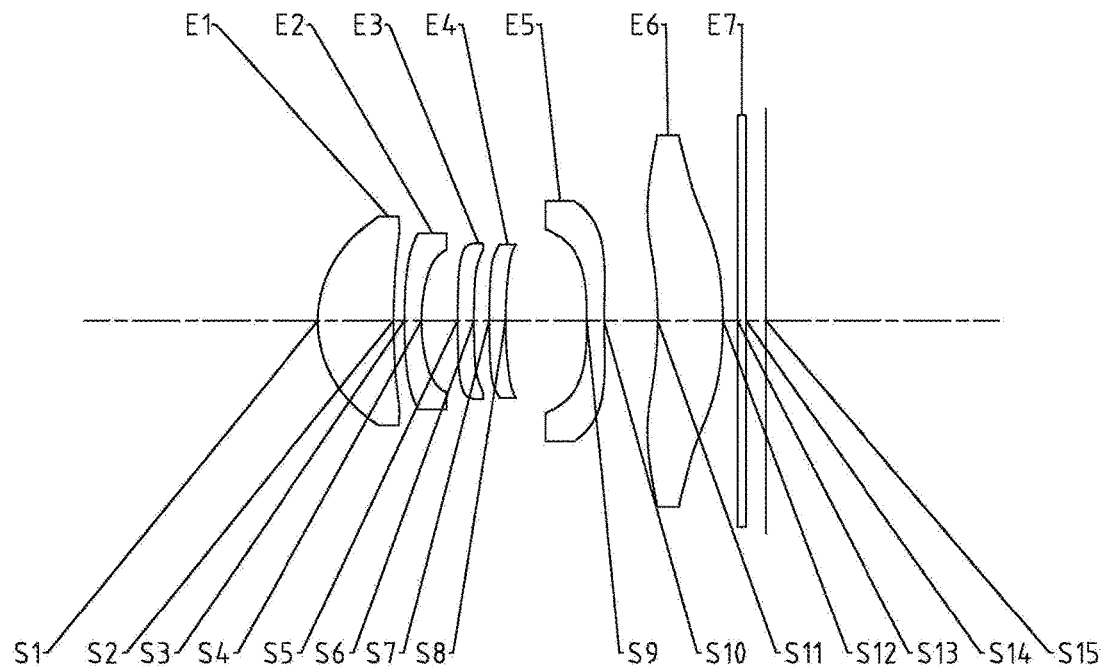
FIG. 1 illustrates a schematic structural view of a first lens system according to Example 1 of the present disclosure.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens, and a first capturing device may also be referred to as a second capturing device without departing from the teachings of the present disclosure.

In the accompanying drawings, the thickness, size and shape of the lens have been slightly exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is a convex surface and the position of the convex is not defined, it indicates that the surface of the lens is convex at least in the paraxial region; and if a surface of a lens is a concave surface and the position of the concave is not defined, it indicates that the surface of the lens is concave at least in the paraxial region. In each lens, the surface closest to the subject is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

An electronic imaging device according to an exemplary embodiment of the present disclosure may include a first capturing device and a second capturing device, wherein the first capturing device includes a first lens system and a first electronic photosensitive element located on an imaging plane of the first lens system, and the second capturing device includes a second lens system and a second electronic photosensitive element located on an imaging plane of the second lens system. The first lens system may include at least one lens having a refractive power, and a lens closest to an object side has a positive refractive power. The second lens system may include at least one lens having a refractive power, and a lens closest to an object side has a negative refractive power.

In an exemplary embodiment, the first capturing device and the second capturing device may be located on the same side of the electronic imaging device so that they may capture objects located on the same side (for example, in front or behind of the electronic imaging device) of the electronic imaging device.

In an exemplary embodiment, the first capturing device and the second capturing device may have different field-of-view. For example, the field-of-view of the second capturing device may be smaller than the field-of-view of the first capturing device. In an exemplary embodiment, the first capturing device may have a telephoto characteristic, and the second capturing device may a wide-angle characteristic. The combination of the first capturing device and the second capturing device may form a wide-angle and telephoto dual camera, which can achieve the effect of hybrid optical zoom through the alternate use of the two types of capturing device in electronic imaging devices. This helps to promote the development of lossless zoom technology for electronic imaging devices such as mobile phones. In an exemplary embodiment, the electronic imaging device according to the present disclosure may satisfy: $20°<\text{Semi-FOV}_T<25°$ and $50°<\text{Semi-FOV}_W<55°$, where $\text{Semi-FOV}_T$ is half of a maximal field-of-view of the first lens system, and $\text{Semi-FOV}_W$ is half of a maximal field-of-view of the second lens system. More specifically, $\text{Semi-FOV}_T$ may further satisfy: $20°<\text{Semi-FOV}_T<23°$, for example, $20.8°$ $\text{Semi-FOV}_T$ $21.3°$, and $\text{Semi-FOV}_W$ may further satisfy: $51°<\text{Semi-FOV}_W<53°$, for example, $52.0°$ $\text{Semi-FOV}_W$ $52.3°$. By reasonably controlling the field-of-view of the first lens system, a higher resolution at the edge field of view may be ensured when shooting the distant object, and a higher relative brightness of the system may also be guaranteed. Under the premise of ensuring the miniaturization of the lens assembly, by controlling the field-of-view of the second lens system, the problems of excessively large aberrations and low illumination at the edge field of view may be effectively avoided, and the electronic imaging device may ensure excellent imaging quality in a wide field-of-view.

In an exemplary embodiment, the electronic imaging device according to the present disclosure may satisfy: $f_T/f_W>3.3$, where $f_T$ is a total effective focal length of the first lens system, and $f_W$ is a total effective focal length of the second lens system. More specifically, referring to Tables 3 and 9 below, selecting the combination of the first lens system with $f_T=6.75$ mm and the second lens system with $f_W=1.99$ mm may make $f_T$ and $f_W$ further satisfy $f_T/f_W \leq 3.39$. When the conditional expression $f_T/f_W>3.3$ is satisfied, the combined zoom lens assembly of the present disclosure may have a high zoom ratio, and at the same time, the thinness of the combined zoom lens assembly may be ensured, which may meet more imaging requirements in the market.

Figure 17:
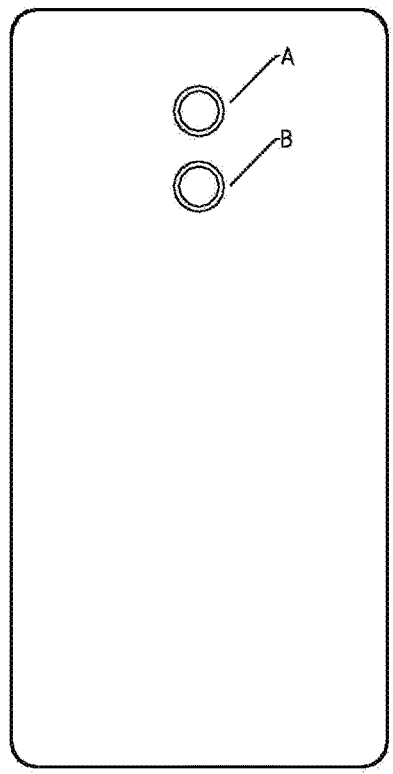
FIG. 17 and FIG. 18 each illustrates a schematic view of different arrangements of a first capturing device and a second capturing device according to the present disclosure.
Figure 18:
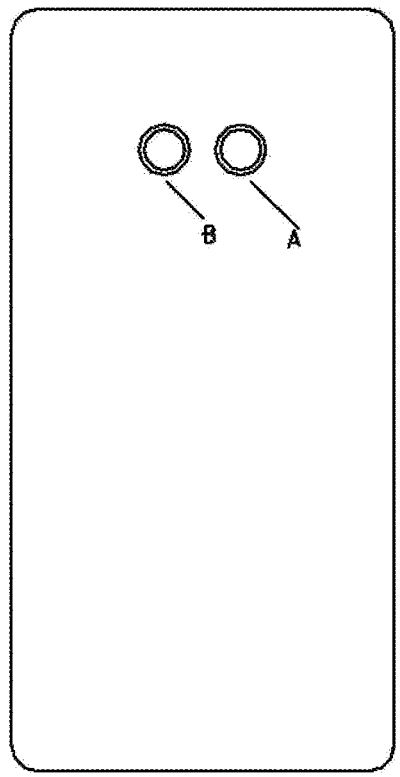

In an exemplary embodiment, the first capturing device and the second capturing device may be arranged longitudinally or laterally on one side of the electronic imaging device. By making the first capturing device and the second capturing device adjacent to each other by longitudinal or lateral arrangement, on the one hand, the chip placed inside the electronic imaging device may be arranged more regularly, thereby facilitating the arrangement and wiring of internal components; on the other hand, it may increase the aesthetic appearance and make it easier for the user to hold the device for taking pictures without causing the user to excessively consider whether a camera is blocked due to an improper holding posture. It should be understood that the "longitudinal arrangement" may be understood as the first capturing device A and the second capturing device B shown in FIG. 17 are arranged in an up-down pattern with respect to the use direction of the electronic imaging device. The "lateral arrangement" may be understood as that the first capturing device A and the second capturing device B shown in FIG. 18 are arranged in a left-right arrangement pattern with respect to a use direction of the electronic imaging device. At the same time, it should also be understood that the arrangement of the first capturing device and the second capturing device is not limited to this, and their relative positions may be adjusted according to actual design needs.

In an exemplary embodiment, the electronic imaging device may be, for example, an independent imaging device such as a digital camera, or also may be an imaging device integrated in a mobile electronic device such as a mobile phone. The electronic photosensitive element mounted on the first capturing device or the second capturing device may be a photosensitive charge-coupled device (CCD) or a complementary metal-oxide semiconductor (CMOS).

The first lens system and the second lens system applicable to the electronic imaging device according to the present disclosure will be described in detail below.

First Lens System

A first lens system according to the present disclosure may include at least one lens having a refractive power, and a lens closest to an object side has a positive refractive power. For example, the first lens system may include six lenses having refractive power, i.e., a first lens, a second lens, a third lens, a fourth lens, a fifth lens, and a sixth lens. The six lenses are sequentially arranged from the object side to an image side along an optical axis. The lens closest to the object side (that is, the first lens) of the first lens system having a positive refractive power, which is beneficial to the distribution of the refractive power of the entire system, avoids excessive concentration of refractive power, and helps the first lens system to compensate longitudinal chromatic aberration and lateral chromatic aberration.

In an exemplary embodiment, the second lens in the first lens system may have a negative refractive power, an object-side surface thereof may be a convex surface, and an image-side surface thereof may be a concave surface.

In an exemplary embodiment, an object-side surface of the third lens in the first lens system may be a convex surface and an image-side surface of the third lens in the first lens system may be a concave surface.

In an exemplary embodiment, the fourth lens in the first lens system may have a negative refractive power, an object-side surface thereof may be a convex surface, and an image-side surface thereof may be a concave surface.

In an exemplary embodiment, the fifth lens in the first lens system may have a negative refractive power, an object-side surface thereof may be a concave surface, and an image-side surface thereof may be a concave surface. By designing the fifth lens of the first lens system to have a negative refractive power, the large aberrations generated by the first lens to the fourth lens may be effectively corrected. By designing the object-side surface and the image-side surface of the fifth lens of the first lens system as concave surfaces, the fifth lens of the first lens system may have better refractive ability, so that the light of the first lens system may be incident on a larger imaging plane, and may have a smaller chief ray angle (CRA), thereby better matching the system chip.

In an exemplary embodiment, the electronic imaging device according to the present disclosure may satisfy: $TTL_T/f_T<0.9$, where $TTL_T$ is a distance along the optical axis of the first lens system from an object-side surface of the first lens of the first lens system to an imaging plane of the first lens system and $f_T$ is a total effective focal length of the first lens system. More specifically, $TTL_T$ and $f_T$ may further satisfy: $0.8<TTL_T/f_T<0.9$, for example, $0.83 \ TTL_T/f_T \leq 0.85$. When the conditional expression $TTL_T/f_T<0.9$ is satisfied, the total effective focal length of the first lens system may be lengthened as much as possible, and the optical zoom factor of the electronic imaging device may be increased as long as the total lens length meets the structural requirements.

In an exemplary embodiment, the electronic imaging device according to the present disclosure may satisfy: $0.4<(f2_T+f5_T)/f4_T<0.7$, where $f2_T$ is an effective focal length of the second lens of the first lens system, $f5_T$ is an effective focal length of the fifth lens of the first lens system, and $f4_T$ is an effective focal length of the fourth lens of the first lens system. More specifically, $f2_T$, $f5_T$ and $f4_T$ may further satisfy: $0.46 \leq (f2_T+f5_T)/f4_T \leq 0.65$. When the conditional expression $0.4<(f2_T+f5_T)/f4_T<0.7$ is satisfied, the refractive powers of the second lens, the fourth lens, and the fifth lens in the first lens system may be reasonably distributed, thereby reducing the deflection angle of the light. This may reduce the sensitivity of the first lens system, reduce the optical distortion of the first lens system, and increase the relative brightness of the edges.

In an exemplary embodiment, the electronic imaging device according to the present disclosure may satisfy: $ImgH_T/f_T<0.5$, where $ImgH_T$ is half of a diagonal length of an effective pixel area on an imaging plane of the first lens system and $f_T$ is a total effective focal length of the first lens system. More specifically, $ImgH_T$ and $f_T$ may further satisfy: $0.3<ImgH_T/f_T<0.5$, for example, $0.39 \leq ImgH_T/f_T \leq 0.40$. When the conditional expression $ImgH_T/f_T<0.5$ is satisfied, the telephoto ratio of the first lens system may be effectively improved, the magnification of the shooting may be increased, and the imaging quality of the electronic imaging device may be improved.

In an exemplary embodiment, the electronic imaging device according to the present disclosure may satisfy: $0.8<R11_T/R12_T<1.3$, where $R11_T$ is a radius of curvature of an object-side surface of the sixth lens of the first lens system, and $R12_T$ is a radius of curvature of an image-side surface of the sixth lens of the first lens system. More specifically, $R11_T$ and $R12_T$ may further satisfy: $0.93 \leq R11_T/R12_T \leq 1.22$. When the conditional expression $0.8<R11_T/R12_T<1.3$ is satisfied, the curvature of the sixth lens of the first lens system may be optimized, the on-axis chromatic aberration of the first lens system may be reduced, and the optical modulation transfer function (MTF) value of the off-axis field may be increased to meet higher imaging requirements. Optionally, the object-side surface of the sixth lens of the first lens system may be a concave surface, and the image-side surface of the sixth lens of the first lens system may be a convex surface.

In an exemplary embodiment, the electronic imaging device according to the present disclosure may satisfy: $0.3<f1234_T/(R1_T+R2_T)<0.6$, where $f1234_T$ is a combined focal length of the first lens, the second lens, the third lens, and the fourth lens of the first lens system, $R1_T$ is a radius of curvature of an object-side surface of the first lens of the first lens system, and $R2_T$ is a radius of curvature of an image-side surface of the first lens of the first lens system.

More specifically, f1234$_T$, R1$_T$ and R2$_T$ may further satisfy: 0.41≤f1234$_T$/(R1$_T$+R2$_T$)≤0.44. When the conditional expression of 0.3<f1234$_T$/(R1$_T$+R2$_T$)<0.6 is satisfied, the total effective focal length of the first lens system may be effectively increased, and the refractive power of the first lens may be reasonably distributed, so as to reduce the sensitivity of actual assembly processing. Optionally, the object-side surface of the first lens of the first lens system may be a convex surface, and the image-side surface of the first lens of the first lens system may be a concave surface.

In an exemplary embodiment, at least four lenses among the first lens to the sixth lens in the first lens system may be made of plastic material. On the basis of considering imaging quality, the use of more plastic materials is more conducive to the formation and processing of the lens, reduce processing errors, control system costs, and is conducive to mass production.

In an exemplary embodiment, each two adjacent lenses in the first lens system may have an air gap therebetween. A certain amount of air gap between adjacent lenses may ensure that adjacent lenses will not contact each other within the processing tolerances of the lenses, thereby avoiding lens wear or fracturing.

In an exemplary embodiment, the first lens system described above may further include at least one stop. The stop may be disposed at an appropriate position as needed, for example, between the object side and the first lens. Optionally, the above first lens system may further include an optical filter for correcting the color deviation and/or a protective glass for protecting the photosensitive element on an imaging plane.

The first lens system according to the above embodiments of the present disclosure may employ a plurality of lenses, such as six lenses as described above. By properly assigning the refractive power of each lens, the surface shape, the center thickness of each lens, and spaced distances on the optical axis between the lenses, the size and the sensitivity of the first lens system may be effectively reduced, and the workability of the first lens system may be improved, such that the first lens system is more advantageous for production processing and may be applied to portable electronic imaging devices.

In the embodiments of the present disclosure, at least one of the surfaces of each lens in the first lens system is aspheric, that is, at least one of an object-side surface and an image-side surface of each lens of the first lens, the second lens, the third lens, the fourth lens, the fifth lens, and the sixth lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration.

By using aspheric lens, the aberrations that occur during imaging may be eliminated as much as possible, and thus improving the image quality. Optionally, the object-side surface and the image-side surface of each lens of the first lens, the second lens, the third lens, the fourth lens, the fifth lens, and the sixth lens of the first lens system are aspheric.

Examples of the first lens system according to the present disclosure will be further described below with reference to FIGS. 1 to 8D.

Example 1

A first lens system according to example 1 of the present disclosure is described below with reference to FIG. 1 to FIG. 2D. FIG. 1 shows a schematic structural view of the first lens system according to example 1 of the present disclosure.

As shown in FIG. 1, the first lens system includes a first lens E1, a second lens E2, a third lens E3, a fourth lens E4, a fifth lens E5, a sixth lens E6, an optical filter E7 and an imaging plane S15, sequentially from an object side to an image side along an optical axis.

The first lens E1 has a positive refractive power. An object-side surface S1 of the first lens E1 is a convex surface, and an image-side surface S2 of the first lens E1 is a concave surface. The second lens E2 has a negative refractive power. An object-side surface S3 of the second lens E2 is a convex surface, and an image-side surface S4 of the second lens E2 is a concave surface. The third lens E3 has a positive refractive power. An object-side surface S5 of the third lens E3 is a convex surface, and an image-side surface S6 of the third lens E3 is a concave surface. The fourth lens E4 has a negative refractive power. An object-side surface S7 of the fourth lens E4 is a convex surface, and an image-side surface S8 of the fourth lens E4 is a concave surface. The fifth lens E5 has a negative refractive power. An object-side surface S9 of the fifth lens E5 is a concave surface, and an image-side surface S10 of the fifth lens E5 is a concave surface. The sixth lens E6 has a positive refractive power. An object-side surface S11 of the sixth lens E6 is a concave surface, and an image-side surface S12 of the sixth lens E6 is a convex surface. The optical filter E7 has an object-side surface S13 and an image-side surface S14. Light from an object sequentially passes through the respective surfaces S1 to S14 and is finally imaged on the imaging plane S15. In this example, the first lens E1 to the sixth lens E6 may be lenses made of plastic material.

Although not shown, a stop may be disposed between the object side and the first lens E1 to further improve the image quality of the lens assembly.

Table 1 shows a basic parameter table of the first lens system in example 1, wherein the units for the radius of curvature, the thickness and the focal length are millimeter (mm).

TABLE 1

Example 1: f$_T$ = 6.90 mm, TTL$_T$ = 5.75 mm, ImgH$_T$ = 2.67 mm, Semi-FOV$_T$ = 20.8°

| Surface number | Surface type | Radius of curvature | Thickness | Refractive index | Abbe number | Material | Focal length | Conic coefficient |
|---|---|---|---|---|---|---|---|---|
| OBJ | spherical | infinite | infinite | | | | | |
| STO | spherical | infinite | −0.7739 | | | | | |
| S1 | aspheric | 1.5044 | 0.9725 | 1.55 | 56.1 | plastic | 3.08 | −0.1562 |
| S2 | aspheric | 11.1768 | 0.1370 | | | | | −4.5221 |
| S3 | aspheric | 6.4257 | 0.2201 | 1.68 | 19.2 | plastic | −5.70 | 22.3443 |

TABLE 1-continued

Example 1: $f_T$ = 6.90 mm, $TTL_T$ = 5.75 mm, $ImgH_T$ = 2.67 mm, Semi-$FOV_T$ = 20.8°

| Surface number | Surface type | Radius of curvature | Thickness | Refractive index | Abbe number | Material | Focal length | Conic coefficient |
|---|---|---|---|---|---|---|---|---|
| S4 | aspheric | 2.3782 | 0.4620 | | | | | 3.5353 |
| S5 | aspheric | 12.4049 | 0.2100 | 1.68 | 19.2 | plastic | 350.07 | 49.3880 |
| S6 | aspheric | 13.0000 | 0.1947 | | | | | 52.0303 |
| S7 | aspheric | 10.2202 | 0.2100 | 1.55 | 56.1 | plastic | −20.11 | 99.0000 |
| S8 | aspheric | 5.2538 | 1.0500 | | | | | 20.6398 |
| S9 | aspheric | −10.5154 | 0.2200 | 1.55 | 56.1 | plastic | −6.88 | 75.3077 |
| S10 | aspheric | 5.8793 | 0.6874 | | | | | −55.4511 |
| S11 | aspheric | −5.2258 | 0.8358 | 1.67 | 20.3 | plastic | 85.32 | −26.1654 |
| S12 | aspheric | −5.0920 | 0.1876 | | | | | −10.0000 |
| S13 | spherical | infinite | 0.1100 | 1.52 | 64.2 | glass | | |
| S14 | spherical | infinite | 0.2523 | | | | | |
| S15 | spherical | infinite | | | | | | |

Where, $f_T$ is a total effective focal length of the first lens system, $TTL_T$ is a distance along the optical axis of the first lens system from the object-side surface S1 of the first lens E1 of the first lens system to the imaging plane S15 of the first lens system, $ImgH_T$ is half of a diagonal length of an effective pixel area on the imaging plane S15 of the first lens system, and Semi-$FOV_T$ is half of a maximal field-of-view of the first lens system.

In example 1, the object-side surface and the image-side surface of any one of the first lens E1 to the sixth lens E6 of the first lens system are aspheric, the surface shape x of each aspheric lens may be defined by using, but not limited to, the following aspheric formula:

$$x = \frac{ch^2}{1 + \sqrt{1 - (k+1)c^2h^2}} + \Sigma A_i h^i \quad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; Ai is a correction coefficient for the i-th order of the aspheric surface. Table 2 below shows high-order coefficients A4, A6, A8, A10, A12, A14, A16, A18 and A20 applicable to each aspheric surface S1-S12 of the first lens system according to example 1.

Figure 2A:
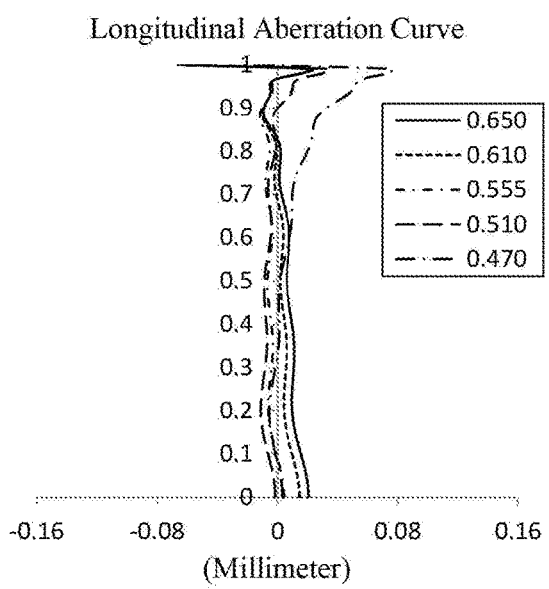
FIGS. 2A to 2D illustrate a longitudinal aberration curve, an astigmatic curve, a distortion curve and a lateral color curve of the first lens system of the Example 1, respectively.
Figure 2B:
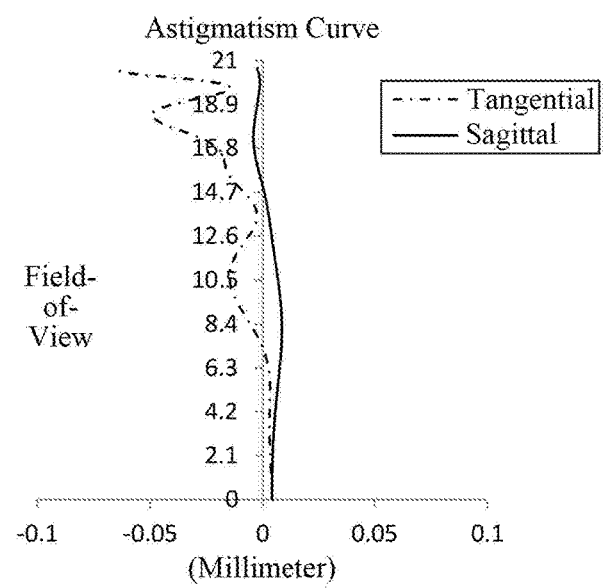
Figure 2C:
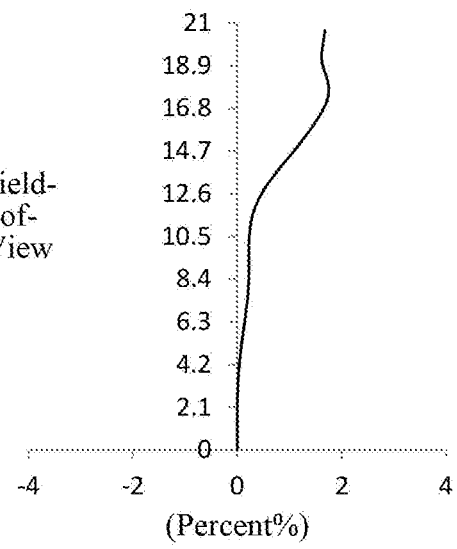
Figure 2D:
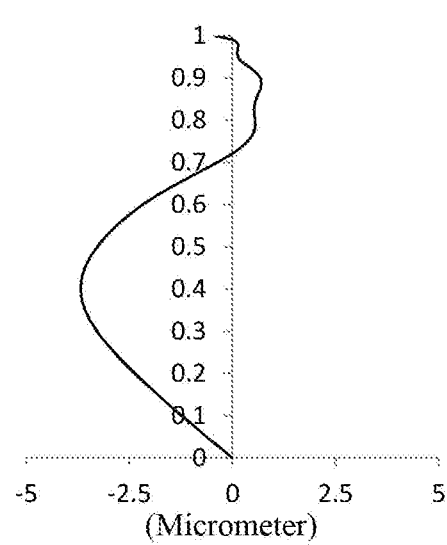

FIG. 2A illustrates a longitudinal aberration curve of the first lens system according to example 1, representing deviations of focal points converged by light of different wavelengths after passing through the lens assembly. FIG. 2B illustrates an astigmatism curve of the first lens system according to example 1, representing a curvature of a tangential plane and a curvature of a sagittal plane. FIG. 2C illustrates a distortion curve of the first lens system according to example 1, representing amounts of distortion at different field-of-views. FIG. 2D illustrates a lateral color curve of the first lens system according to example 1, representing deviations of different image heights on an imaging plane after light passes through the lens assembly. It can be seen from FIG. 2A to FIG. 2D that the first lens system provided in example 1 may achieve good image quality.

Example 2

Figure 3:
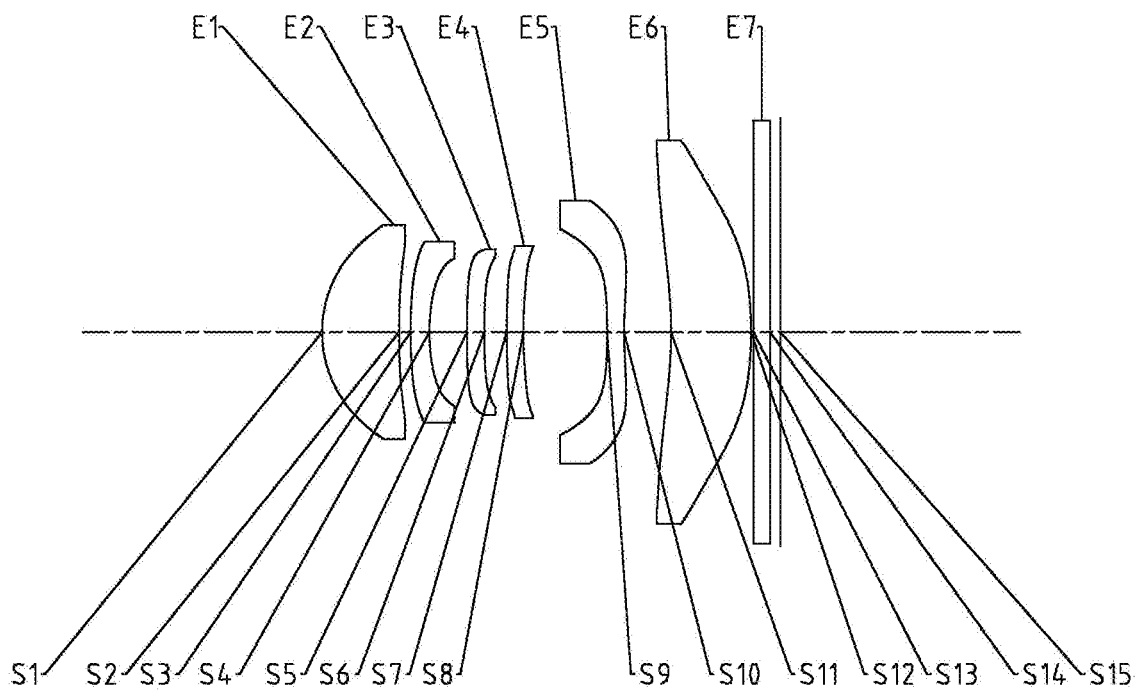
FIG. 3 illustrates a schematic structural view of a first lens system according to Example 2 of the present disclosure.

A first lens system according to example 2 of the present disclosure is described below with reference to FIG. 3 to FIG. 4D. In this example and the following examples, for the purpose of brevity, the description of parts similar to those in example 1 will be omitted. FIG. 3 is a schematic structural view of the first lens system according to example 2 of the present disclosure.

As shown in FIG. 3, the first lens system includes a first lens E1, a second lens E2, a third lens E3, a fourth lens E4, a fifth lens E5, a sixth lens E6, an optical filter E7 and an imaging plane S15, sequentially from an object side to an image side along an optical axis.

TABLE 2

| Surface number | A4 | A6 | A8 | A10 | A12 | A14 | A16 | A18 | A20 |
|---|---|---|---|---|---|---|---|---|---|
| S1 | 6.7160E−03 | −1.3490E−02 | 6.6504E−02 | −1.6354E−01 | 2.4724E−01 | −2.2645E−01 | 1.2145E−01 | −3.4380E−02 | 3.7820E−03 |
| S2 | 1.2553E−02 | 1.2382E−02 | 1.3709E−02 | −5.4900E−02 | 3.6557E−02 | 3.3888E−02 | −7.3120E−02 | 4.3187E−02 | −8.6300E−03 |
| S3 | −4.4020E−02 | 1.5397E−01 | −3.3377E−01 | 1.1016E+00 | −2.6169E+00 | 3.8196E+00 | −3.3113E+00 | 1.5531E+00 | −3.0051E−01 |
| S4 | −6.9360E−02 | 2.9720E−01 | −1.0376E+00 | 3.2839E+00 | −2.9779E+00 | −9.4976E+00 | 3.0793E+01 | −3.3957E+01 | 1.3707E+01 |
| S5 | −2.7050E−02 | −4.9290E−02 | 7.9855E−01 | −3.5589E+00 | 1.3577E+01 | −3.2546E+01 | 4.5362E+01 | −3.4024E+01 | 1.0614E+01 |
| S6 | 4.1387E−02 | −1.1792E−01 | 4.4116E−01 | −4.7897E−01 | 4.5252E+00 | −1.9177E+01 | 3.7649E+01 | −3.6136E+01 | 1.3522E+01 |
| S7 | 4.9905E−02 | −3.3618E−01 | 5.5449E−01 | 6.1183E−01 | −3.2176E+00 | 5.4858E+00 | −4.3011E+00 | 1.0649E+00 | 1.5022E−01 |
| S8 | 1.9842E−02 | −4.1903E−01 | 2.1891E+00 | −9.2424E+00 | 2.6763E+01 | −4.8529E+01 | 5.2897E+01 | −3.1449E+01 | 7.7821E+00 |
| S9 | −2.5097E−01 | 1.5840E−01 | 1.0544E−02 | −3.2875E−01 | 4.1601E−01 | −2.5835E−01 | 5.6970E−02 | 1.3078E−02 | −5.5100E−03 |
| S10 | −2.0190E−01 | 2.1286E−01 | −1.3960E−01 | 1.6912E−02 | 4.4000E−02 | −4.1450E−02 | 1.7989E−02 | −3.8900E−03 | 3.2400E−04 |
| S11 | −2.9460E−02 | −4.0900E−03 | 3.7894E−02 | −2.5700E−02 | 8.5630E−03 | −1.6900E−03 | 2.0600E−04 | −1.5000E−05 | 4.8400E−07 |
| S12 | −4.0340E−02 | 7.9200E−05 | 6.7840E−03 | −6.6500E−03 | 5.1520E−03 | −2.0800E−03 | 4.3500E−04 | −4.6000E−05 | 1.9100E−06 |

The first lens E1 has a positive refractive power. An object-side surface S1 of the first lens E1 is a convex surface, and an image-side surface S2 of the first lens E1 is a concave surface. The second lens E2 has a negative refractive power. An object-side surface S3 of the second lens E2 is a convex surface, and an image-side surface S4 of the second lens E2 is a concave surface. The third lens E3 has a negative refractive power. An object-side surface S5 of the third lens E3 is a convex surface, and an image-side surface S6 of the third lens E3 is a concave surface. The fourth lens E4 has a negative refractive power. An object-side surface S7 of the fourth lens E4 is a convex surface, and an image-side surface S8 of the fourth lens E4 is a concave surface. The fifth lens E5 has a negative refractive power. An object-side surface S9 of the fifth lens E5 is a concave surface, and an image-side surface S10 of the fifth lens E5 is a concave surface. The sixth lens E6 has a positive refractive power. An object-side surface S11 of the sixth lens E6 is a concave surface, and an image-side surface S12 of the sixth lens E6 is a convex surface. The optical filter E7 has an object-side surface S13 and an image-side surface S14. Light from an object sequentially passes through the respective surfaces S1 to S14 and is finally imaged on the imaging plane S15. In this example, the first lens E1 to the sixth lens E6 may be lenses made of plastic material.

Although not shown, a stop may be disposed between the object side and the first lens E1 to further improve the image quality of the lens assembly.

Table 3 shows a basic parameter table of the first lens system in example 2, wherein the units for the radius of curvature, the thickness and the focal length are millimeter (mm). Table 4 shows high-order coefficients applicable to each aspheric surface in example 2, wherein the surface shape of each aspheric surface may be defined by the formula (1) given in the above example 1.

TABLE 3

Example 2: $f_T$ = 6.75 mm, $TTL_T$ = 5.75 mm, $ImgH_T$ = 2.67 mm, Semi-$FOV_T$ = 21.3°

| Surface number | Surface type | Radius of curvature | Thickness | Refractive index | Abbe number | Material | Focal length | Conic coefficient |
|---|---|---|---|---|---|---|---|---|
| OBJ | spherical | infinite | infinite | | | | | |
| STO | spherical | infinite | −0.7607 | | | | | |
| S1 | aspheric | 1.5016 | 0.9652 | 1.55 | 56.1 | plastic | 3.09 | −0.1592 |
| S2 | aspheric | 10.4925 | 0.1449 | | | | | −4.6173 |
| S3 | aspheric | 6.3016 | 0.2355 | 1.68 | 19.2 | plastic | −5.86 | 21.3006 |
| S4 | aspheric | 2.3986 | 0.4720 | | | | | 3.5073 |
| S5 | aspheric | 12.0025 | 0.2176 | 1.68 | 19.2 | plastic | −78.12 | 38.1963 |
| S6 | aspheric | 9.7122 | 0.2798 | | | | | 9.5695 |
| S7 | aspheric | 11.2863 | 0.2100 | 1.55 | 56.1 | plastic | −27.07 | 99.0000 |
| S8 | aspheric | 6.3574 | 1.0500 | | | | | 18.2215 |
| S9 | aspheric | −13.0780 | 0.2132 | 1.55 | 56.1 | plastic | −6.57 | 98.5705 |
| S10 | aspheric | 4.9731 | 0.5892 | | | | | −33.8270 |
| S11 | aspheric | −6.0362 | 1.0028 | 1.67 | 20.3 | plastic | 36.40 | −33.8270 |
| S12 | aspheric | −5.1547 | 0.0300 | | | | | −10.0000 |
| S13 | spherical | infinite | 0.2100 | 1.52 | 64.2 | glass | | |
| S14 | spherical | infinite | 0.1297 | | | | | |
| S15 | spherical | infinite | | | | | | |

TABLE 4

| Surface number | A4 | A6 | A8 | A10 | A12 | A14 | A16 | A18 | A20 |
|---|---|---|---|---|---|---|---|---|---|
| S1 | 6.4800E−03 | −1.2569E−02 | 6.5813E−02 | −1.7110E−01 | 2.6966E−01 | −2.5619E−01 | 1.4271E−01 | −4.2287E−02 | 4.9735E−03 |
| S2 | 1.2961E−02 | 1.2828E−02 | 9.8735E−03 | −3.7803E−02 | −6.4575E−03 | 9.7384E−02 | −1.2791E−01 | 6.8116E−02 | −1.3184E−02 |
| S3 | −4.5599E−02 | 1.6591E−01 | −3.6636E−01 | 1.1992E+00 | −2.8928E+00 | 4.2927E+00 | −3.7811E+00 | 1.8027E+00 | −3.5489E−01 |
| S4 | −7.6905E−02 | 4.2672E−01 | −2.2815E+00 | 1.0693E+01 | −2.9182E+01 | 4.6012E+01 | −3.8625E+01 | 1.3254E+01 | 2.3605E−01 |
| S5 | −4.2388E−02 | 1.0441E−01 | −2.8304E−01 | 2.1834E+00 | −6.4020E+00 | 1.0464E+01 | −9.9214E+00 | 4.7702E+00 | −7.6560E−01 |
| S6 | 3.2864E−02 | −1.3567E−01 | 9.4035E−01 | −2.8065E+00 | 8.1478E+00 | −1.6866E+01 | 2.2141E+01 | −1.6896E+01 | 5.6358E+00 |
| S7 | 7.7033E−02 | −5.0300E−01 | 1.3051E+00 | −2.6506E+00 | 4.9086E+00 | −6.1453E+00 | 4.7242E+00 | −2.1232E+00 | 4.3515E−01 |
| S8 | 6.1315E−02 | −2.8754E−01 | 2.7377E−01 | 3.0724E−01 | −9.8342E−01 | 1.0374E+00 | −2.9771E−01 | −2.2728E−01 | 1.2409E−01 |
| S9 | −1.5306E−01 | 1.6384E−01 | −4.5416E−01 | 6.3430E−01 | −6.2050E−01 | 4.1394E−01 | −1.8015E−01 | 4.7307E−02 | −5.6342E−03 |
| S10 | −9.9774E−02 | 1.5142E−01 | −2.8964E−01 | 2.9079E−01 | −1.7555E−01 | 6.3489E−02 | −1.2533E−02 | 1.0050E−03 | 6.8646E−06 |
| S11 | −6.1604E−02 | 9.2568E−02 | −7.3939E−02 | 3.7593E−02 | −1.2734E−02 | 2.8689E−03 | −4.1114E−04 | 3.3713E−05 | −1.1988E−06 |
| S12 | −6.5648E−02 | 3.6134E−02 | −2.0280E−02 | 6.8242E−03 | −7.2436E−04 | −2.0602E−04 | 7.4209E−05 | −8.8033E−06 | 3.7733E−07 |

Figure 4A:
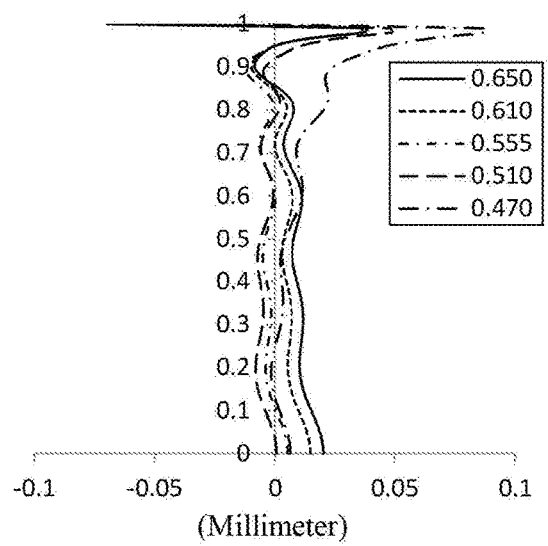
FIGS. 4A to 4D illustrate a longitudinal aberration curve, an astigmatic curve, a distortion curve and a lateral color curve of the first lens system of the Example 2, respectively.
Figure 4B:
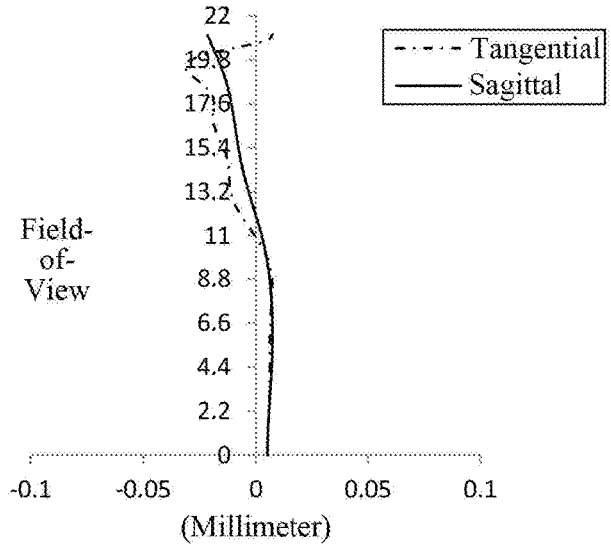
Figure 4C:
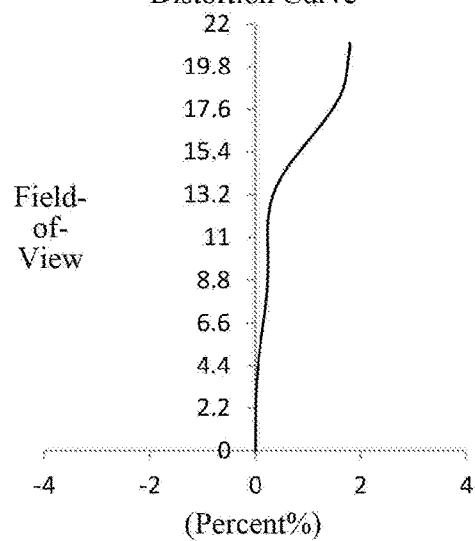
Figure 4D:
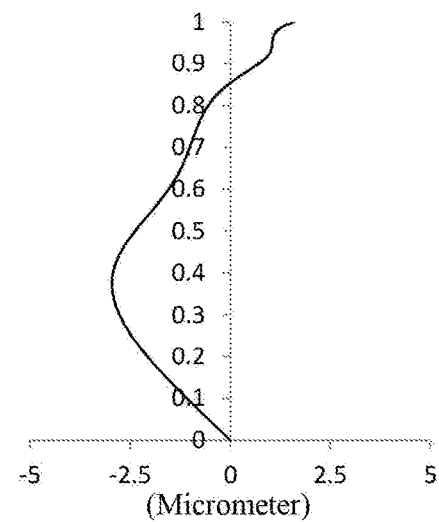

FIG. 4A illustrates a longitudinal aberration curve of the first lens system according to example 2, representing deviations of focal points converged by light of different wavelengths after passing through the lens assembly. FIG. 4B illustrates an astigmatism curve of the first lens system according to example 2, representing a curvature of a tangential plane and a curvature of a sagittal plane. FIG. 4C illustrates a distortion curve of the first lens system according to example 2, representing amounts of distortion at different field-of-views. FIG. 4D illustrates a lateral color curve of the first lens system according to example 2, representing deviations of different image heights on an imaging plane after light passes through the lens assembly. It can be seen from FIG. 4A to FIG. 4D that the first lens system provided in example 2 may achieve good image quality.

Example 3

Figure 5:
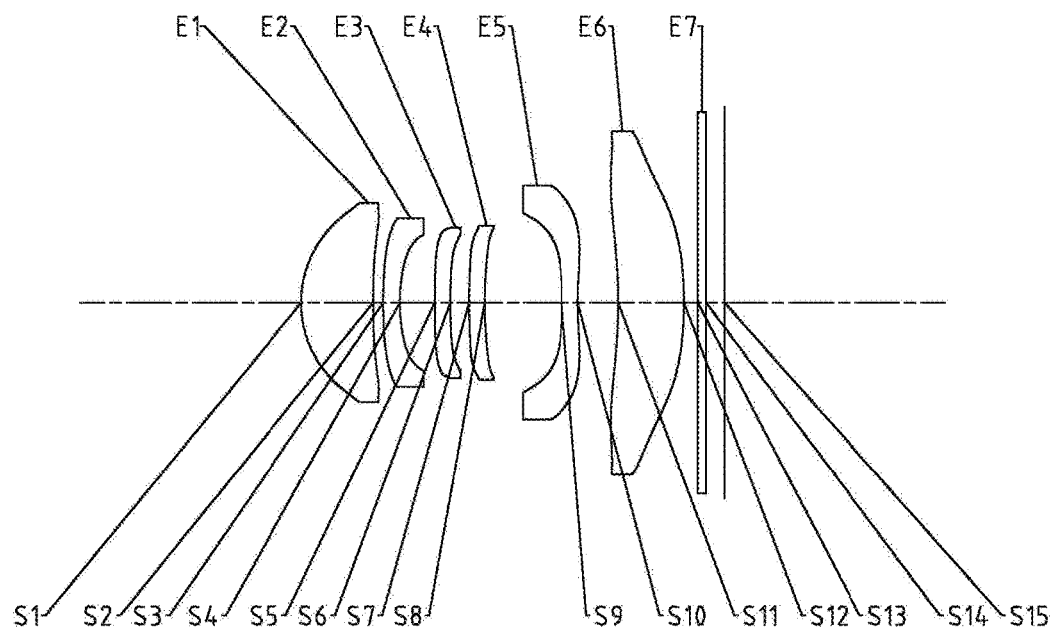
FIG. 5 illustrates a schematic structural view of a first lens system according to Example 3 of the present disclosure.

A first lens system according to example 3 of the present disclosure is described below with reference to FIG. 5 to FIG. 6D. FIG. 5 is a schematic structural view of the first lens system according to example 3 of the present disclosure.

As shown in FIG. 5, the first lens system includes a first lens E1, a second lens E2, a third lens E3, a fourth lens E4, a fifth lens E5, a sixth lens E6, an optical filter E7 and an imaging plane S15, sequentially from an object side to an image side along an optical axis.

The first lens E1 has a positive refractive power. An object-side surface S1 of the first lens E1 is a convex surface, and an image-side surface S2 of the first lens E1 is a concave surface. The second lens E2 has a negative refractive power. An object-side surface S3 of the second lens E2 is a convex surface, and an image-side surface S4 of the second lens E2 is a concave surface. The third lens E3 has a negative refractive power. An object-side surface S5 of the third lens E3 is a convex surface, and an image-side surface S6 of the third lens E3 is a concave surface. The fourth lens E4 has a negative refractive power. An object-side surface S7 of the fourth lens E4 is a convex surface, and an image-side surface S8 of the fourth lens E4 is a concave surface. The fifth lens E5 has a negative refractive power. An object-side surface S9 of the fifth lens E5 is a concave surface, and an image-side surface S10 of the fifth lens E5 is a concave surface. The sixth lens E6 has a positive refractive power. An object-side surface S11 of the sixth lens E6 is a concave surface, and an image-side surface S12 of the sixth lens E6 is a convex surface. The optical filter E7 has an object-side surface S13 and an image-side surface S14. Light from an object sequentially passes through the respective surfaces S1 to S14 and is finally imaged on the imaging plane S15. In this example, the first lens E1 to the sixth lens E6 may be lenses made of plastic material.

Although not shown, a stop may be disposed between the object side and the first lens E1 to further improve the image quality of the lens assembly.

Table 5 shows a basic parameter table of the first lens system in example 3, wherein the units for the radius of curvature, the thickness and the focal length are millimeter (mm). Table 6 shows high-order coefficients applicable to each aspheric surface in example 3, wherein the surface shape of each aspheric surface may be defined by the formula (1) given in the above example 1.

TABLE 5

Example 3: $f_T$ = 6.85 mm, $TTL_T$ = 5.75 mm, $ImgH_T$ = 2.67 mm, Semi-$FOV_T$ = 21.0°

| Surface number | Surface type | Radius of curvature | Thickness | Refractive index | Abbe number | Material | Focal length | Conic coefficient |
|---|---|---|---|---|---|---|---|---|
| OBJ | spherical | infinite | infinite | | | | | |
| STO | spherical | infinite | −0.7883 | | | | | |
| S1 | aspheric | 1.5015 | 0.9754 | 1.55 | 56.1 | plastic | 3.08 | −0.1566 |
| S2 | aspheric | 10.7115 | 0.1359 | | | | | −2.8948 |
| S3 | aspheric | 6.3114 | 0.2280 | 1.68 | 19.2 | plastic | −5.95 | 21.9462 |
| S4 | aspheric | 2.4230 | 0.4750 | | | | | 3.5094 |
| S5 | aspheric | 12.8428 | 0.2100 | 1.68 | 19.2 | plastic | −57.05 | 31.9074 |
| S6 | aspheric | 9.5762 | 0.2533 | | | | | 28.5760 |
| S7 | aspheric | 11.0581 | 0.2100 | 1.55 | 56.1 | plastic | −24.43 | 97.5149 |
| S8 | aspheric | 6.0048 | 1.0500 | | | | | 20.4667 |
| S9 | aspheric | −12.3848 | 0.2200 | 1.55 | 56.1 | plastic | −6.39 | 99.0000 |
| S10 | aspheric | 4.8837 | 0.5493 | | | | | −34.4045 |
| S11 | aspheric | −6.7583 | 0.8925 | 1.67 | 20.3 | plastic | 36.22 | −75.0192 |
| S12 | aspheric | −5.5587 | 0.1876 | | | | | −10.0000 |
| S13 | spherical | infinite | 0.1100 | 1.52 | 64.2 | glass | | |
| S14 | spherical | infinite | 0.2520 | | | | | |
| S15 | spherical | infinite | | | | | | |

TABLE 6

| Surface number | A4 | A6 | A8 | A10 | A12 | A14 | A16 | A18 | A20 |
|---|---|---|---|---|---|---|---|---|---|
| S1 | 6.6329E−03 | −1.3368E−02 | 6.7197E−02 | −1.6780E−01 | 2.5660E−01 | −2.3817E−01 | 1.2992E−01 | −3.7617E−02 | 4.2887E−03 |
| S2 | 1.2645E−02 | 1.2562E−02 | 1.1660E−02 | −4.6947E−02 | 2.0716E−02 | 5.2088E−02 | −8.4998E−02 | 4.7152E−02 | −9.1326E−03 |
| S3 | −4.4379E−02 | 1.5234E−01 | −3.1720E−01 | 1.0142E+00 | −2.3778E+00 | 3.4399E+00 | −2.9619E+00 | 1.3802E+00 | −2.6493E−01 |
| S4 | −6.9435E−02 | 3.2762E−01 | −1.3736E+00 | 5.2233E+00 | −9.3210E+00 | 2.6633E+00 | 1.7133E+01 | −2.5577E+01 | 1.1497E+01 |
| S5 | −3.7701E−02 | 1.3572E−01 | −8.1172E−01 | 4.5881E+00 | −1.2037E+01 | 1.7855E+01 | −1.4847E+01 | 5.7577E+00 | −4.9196E−01 |

TABLE 6-continued

| Surface number | A4 | A6 | A8 | A10 | A12 | A14 | A16 | A18 | A20 |
|---|---|---|---|---|---|---|---|---|---|
| S6 | 3.4423E−02 | −1.1683E−02 | −4.4577E−01 | 4.0641E+00 | −1.1393E+01 | 1.7352E+01 | −1.3787E+01 | 3.6110E+00 | 7.6646E−01 |
| S7 | 7.9169E−02 | −5.3576E−01 | 1.4464E+00 | −2.8693E+00 | 5.2076E+00 | −6.3240E+00 | 4.5948E+00 | −1.9080E+00 | 3.6032E−01 |
| S8 | 5.4039E−02 | −4.2222E−01 | 1.2123E+00 | −3.1851E+00 | 7.1837E+00 | −1.0983E+01 | 1.0464E+01 | −5.5422E+00 | 1.2270E+00 |
| S9 | −1.4212E−01 | −4.5233E−02 | 4.7830E−02 | 6.2255E−02 | −3.2348E−01 | 4.3162E−01 | −2.8468E−01 | 9.5114E−02 | −1.2676E−02 |
| S10 | −6.6387E−02 | −7.1246E−02 | 1.7273E−01 | −2.3094E−01 | 1.9095E−01 | −9.9618E−02 | 3 1767E−02 | −5.6415E−03 | 4.2494E−04 |
| S11 | −1.1410E−02 | 7.6929E−03 | −2.6028E−03 | 2.5683E−03 | −1.4896E−03 | 4.3725E−04 | −7.1500E−05 | 6.4553E−06 | −2.6012E−07 |
| S12 | −3.5707E−02 | 8.2019E−03 | −5.1857E−03 | 1.0203E−03 | 9.8704E−04 | −5.2031E−04 | 9.8654E−05 | −8.1816E−06 | 2.3571E−07 |

Figure 6A:
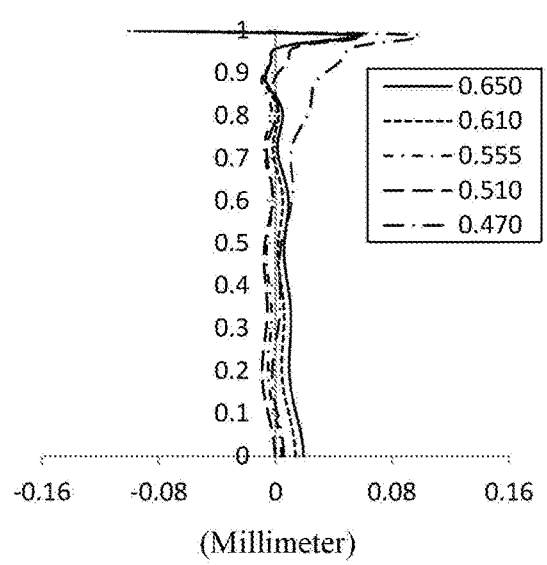
FIGS. 6A to 6D illustrate a longitudinal aberration curve, an astigmatic curve, a distortion curve and a lateral color curve of the first lens system of the Example 3, respectively.
Figure 6B:
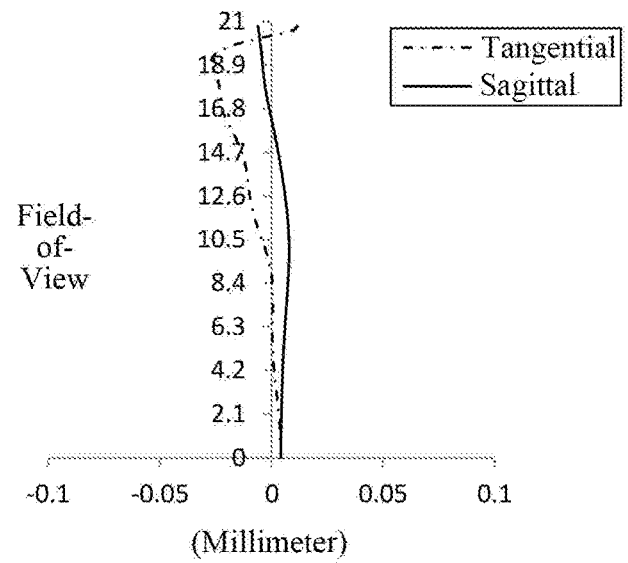
Figure 6C:
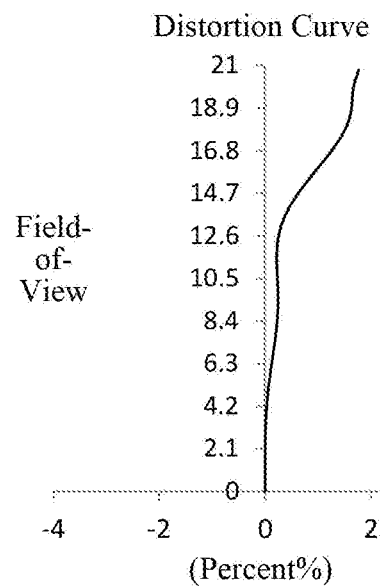
Figure 6D:
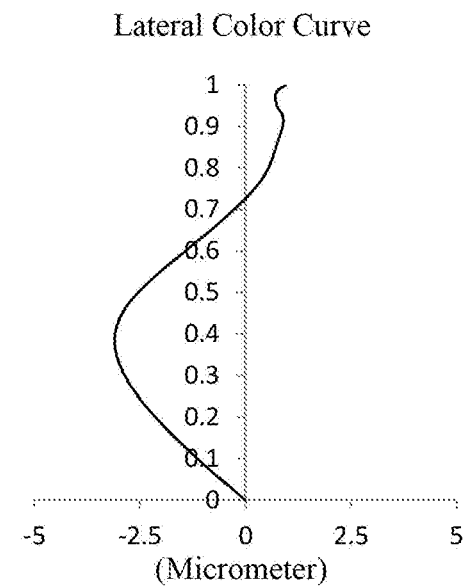

FIG. 6A illustrates a longitudinal aberration curve of the first lens system according to example 3, representing deviations of focal points converged by light of different wavelengths after passing through the lens assembly. FIG. 6B illustrates an astigmatism curve of the first lens system according to example 3, representing a curvature of a tangential plane and a curvature of a sagittal plane. FIG. 6C illustrates a distortion curve of the first lens system according to example 3, representing amounts of distortion at different field-of-views. FIG. 6D illustrates a lateral color curve of the first lens system according to example 3, representing deviations of different image heights on an imaging plane after light passes through the lens assembly. It can be seen from FIG. 6A to FIG. 6D that the first lens system provided in example 3 may achieve good image quality.

Example 4

Figure 7:
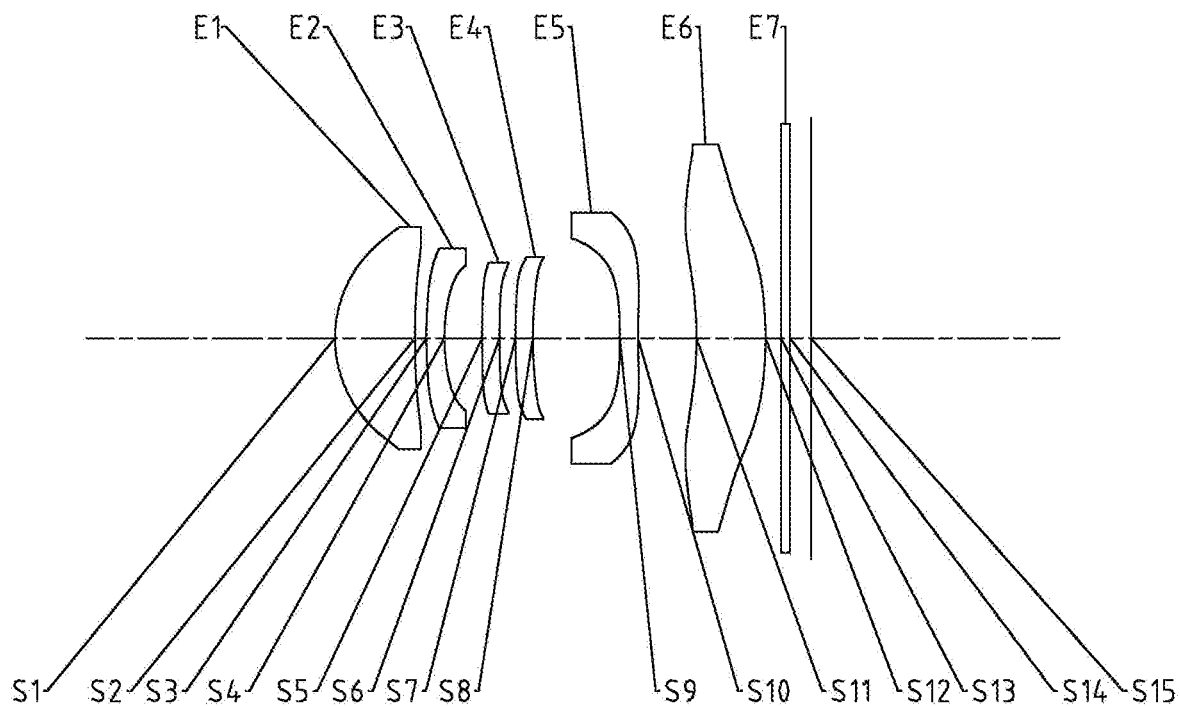
FIG. 7 illustrates a schematic structural view of a first lens system according to Example 4 of the present disclosure.

A first lens system according to example 4 of the present disclosure is described below with reference to FIG. 7 to FIG. 8D. FIG. 7 is a schematic structural view of the first lens system according to example 4 of the present disclosure.

As shown in FIG. 7, the first lens system includes a first lens E1, a second lens E2, a third lens E3, a fourth lens E4, a fifth lens E5, a sixth lens E6, an optical filter E7 and an imaging plane S15, sequentially from an object side to an image side along an optical axis.

The first lens E1 has a positive refractive power. An object-side surface S1 of the first lens E1 is a convex surface, and an image-side surface S2 of the first lens E1 is a concave surface. The second lens E2 has a negative refractive power. An object-side surface S3 of the second lens E2 is a convex surface, and an image-side surface S4 of the second lens E2 is a concave surface. The third lens E3 has a positive refractive power. An object-side surface S5 of the third lens E3 is a convex surface, and an image-side surface S6 of the third lens E3 is a concave surface. The fourth lens E4 has a negative refractive power. An object-side surface S7 of the fourth lens E4 is a convex surface, and an image-side surface S8 of the fourth lens E4 is a concave surface. The fifth lens E5 has a negative refractive power. An object-side surface S9 of the fifth lens E5 is a concave surface, and an image-side surface S10 of the fifth lens E5 is a concave surface. The sixth lens E6 has a positive refractive power. An object-side surface S11 of the sixth lens E6 is a concave surface, and an image-side surface S12 of the sixth lens E6 is a convex surface. The optical filter E7 has an object-side surface S13 and an image-side surface S14. Light from an object sequentially passes through the respective surfaces S1 to S14 and is finally imaged on the imaging plane S15. In this example, the first lens E1 to the sixth lens E6 may be lenses made of plastic material.

Although not shown, a stop may be disposed between the object side and the first lens E1 to further improve the image quality of the lens assembly.

Table 7 shows a basic parameter table of the first lens system in example 4, wherein the units for the radius of curvature, the thickness and the focal length are millimeter (mm). Table 8 shows high-order coefficients applicable to each aspheric surface in example 4, wherein the surface shape of each aspheric surface may be defined by the formula (1) given in the above example 1.

TABLE 7

Example 4: $f_T$ = 6.90 mm, $TTL_T$ = 5.75 mm, $ImgH_T$ = 2.67 mm, Semi-$FOV_T$ = 20.8°

| Surface number | Surface type | Radius of curvature | Thickness | Refractive index | Abbe number | Material | Focal length | Conic coefficient |
|---|---|---|---|---|---|---|---|---|
| OBJ | spherical | infinite | infinite | | | | | |
| STO | spherical | infinite | −0.7751 | | | | | |
| S1 | aspheric | 1.5038 | 0.9665 | 1.55 | 56.1 | plastic | 3.08 | −0.1551 |
| S2 | aspheric | 11.1483 | 0.1374 | | | | | −4.2495 |
| S3 | aspheric | 6.3859 | 0.2180 | 1.68 | 19.2 | plastic | −5.73 | 22.5282 |
| S4 | aspheric | 2.3823 | 0.4553 | | | | | 3.5831 |
| S5 | aspheric | 12.5749 | 0.2100 | 1.68 | 19.2 | plastic | 729.59 | 55.3735 |
| S6 | aspheric | 12.8161 | 0.1929 | | | | | 58.9461 |
| S7 | aspheric | 10.1243 | 0.2100 | 1.55 | 56.1 | plastic | −20.20 | 98.5357 |
| S8 | aspheric | 5.2396 | 1.0500 | | | | | 20.9408 |
| S9 | aspheric | −9.9443 | 0.2200 | 1.55 | 56.1 | plastic | −7.39 | 66.2678 |
| S10 | aspheric | 6.8458 | 0.7060 | | | | | −37.1733 |
| S11 | aspheric | −4.9258 | 0.8333 | 1.67 | 20.3 | plastic | −956.31 | −49.9637 |
| S12 | aspheric | −5.3000 | 0.1876 | | | | | −10.0000 |
| S13 | spherical | 无穷 | 0.1100 | 1.52 | 64.2 | glass | | |

TABLE 7-continued

Example 4: $f_T = 6.90$ mm, $TTL_T = 5.75$ mm, $ImgH_T = 2.67$ mm, Semi-FOV$_T$ = 20.8°

| Surface number | Surface type | Radius of curvature | Thickness | Refractive index | Abbe number | Material | Focal length | Conic coefficient |
|---|---|---|---|---|---|---|---|---|
| S14 | spherical | 无穷 | 0.2523 | | | | | |
| S15 | spherical | 无穷 | | | | | | |

TABLE 8

| Surface number | A4 | A6 | A8 | A10 | A12 | A14 | A16 | A18 | A20 |
|---|---|---|---|---|---|---|---|---|---|
| S1 | 6.8310E−03 | −1.3350E−02 | 6.6675E−02 | −1.6405E−01 | 2.4743E−01 | −2.2586E−01 | 1.2079E−01 | −3.4120E−02 | 3.7410E−03 |
| S2 | 1.2498E−02 | 1.2395E−02 | 1.3554E−02 | −5.4380E−02 | 3.5910E−02 | 3.4189E−02 | −7.2970E−02 | 4.3019E−02 | −8.5900E−03 |
| S3 | −4.4190E−02 | 1.5422E−01 | −3.3610E−01 | 1.1198E+00 | −2.6753E+00 | 3.9224E+00 | −3.4128E+00 | 1.6062E+00 | −3.1194E−01 |
| S4 | −6.8200E−02 | 2.7797E−01 | −8.5582E−01 | 2.3192E+00 | 2.4715E−01 | −1.6356E+01 | 3.9833E+01 | −4.0666E+01 | 1.5849E+01 |
| S5 | −2.8010E−02 | −4.3460E−02 | 7.4265E−01 | −3.0449E+00 | 1.1401E+01 | −2.7519E+01 | 3.8824E+01 | −2.9577E+01 | 9.3915E+00 |
| S6 | 3.5374E−02 | −5.3610E−02 | −1.1906E−01 | 2.8622E+00 | −7.2976E+00 | 6.1962E+00 | 5.3666E+00 | −1.3944E+01 | 7.2010E+00 |
| S7 | 4.3539E−02 | −2.9119E−01 | 2.8706E−01 | 1.9143E+00 | −7.1050E+00 | 1.2729E+01 | −1.2473E+01 | 6.1060E+00 | −1.1474E+00 |
| S8 | 1.6076E−02 | −3.7053E−01 | 1.7946E+00 | −7.3827E+00 | 2.1561E+01 | −3.9686E+01 | 4.3986E+01 | −2.6572E+01 | 6.6661E+00 |
| S9 | −1.9939E−01 | 9.0724E−02 | 9.0106E−02 | −4.8351E−01 | 6.9199E−01 | −5.6109E−01 | 2.4811E−01 | −5.0900E−02 | 3.2270E−03 |
| S10 | −1.6234E−01 | 1.4609E−01 | −5.2640E−02 | −9.0430E−02 | 1.4573E−01 | −1.0506E−01 | 4.2339E−02 | −9.0500E−03 | 7.8800E−04 |
| S11 | −5.1010E−02 | 2.4819E−02 | 1.3295E−02 | −1.2750E−02 | 4.2550E−03 | −7.8000E−04 | 8.6300E−05 | −5.6000E−06 | 1.7100E−07 |
| S12 | −3.7890E−02 | −3.6400E−03 | 1.0956E−02 | −9.2300E−03 | 5.9000E−03 | −2.1400E−03 | 4.1900E−04 | −4.2000E−05 | 1.6700E−06 |

Figure 8A:
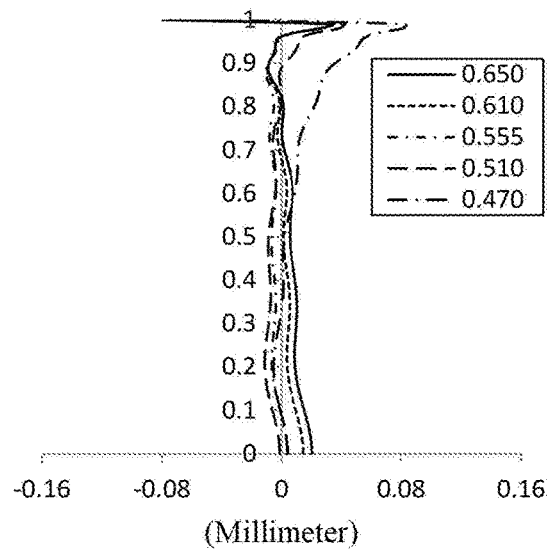
FIGS. 8A to 8D illustrate a longitudinal aberration curve, an astigmatic curve, a distortion curve and a lateral color curve of the first lens system of the Example 4, respectively.
Figure 8B:
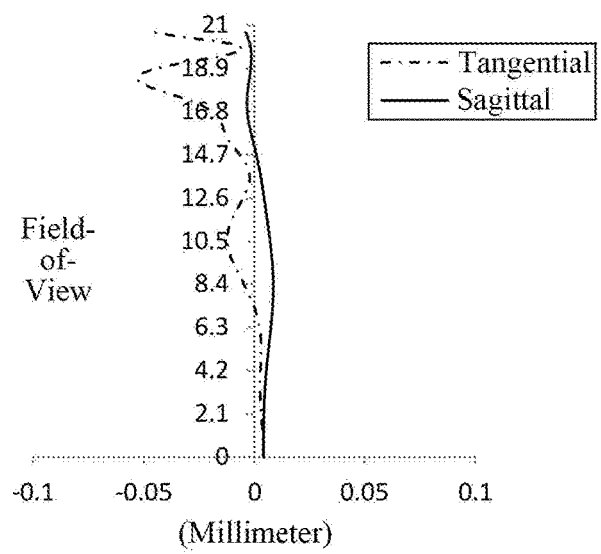
Figure 8C:
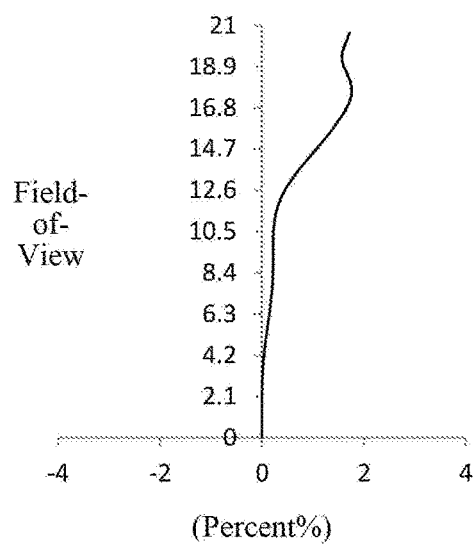
Figure 8D:
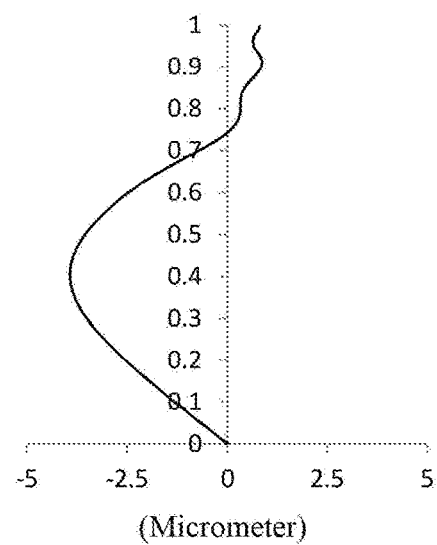

FIG. 8A illustrates a longitudinal aberration curve of the first lens system according to example 4, representing deviations of focal points converged by light of different wavelengths after passing through the lens assembly. FIG. 8B illustrates an astigmatism curve of the first lens system according to example 4, representing a curvature of a tangential plane and a curvature of a sagittal plane. FIG. 8C illustrates a distortion curve of the first lens system according to example 4, representing amounts of distortion at different field-of-views. FIG. 8D illustrates a lateral color curve of the first lens system according to example 4, representing deviations of different image heights on an imaging plane after light passes through the lens assembly. It can be seen from FIG. 8A to FIG. 8D that the first lens system provided in example 4 may achieve good image quality.

Second Lens System

A second lens system according to the present disclosure may include at least one lens having a refractive power, and a lens closest to an object side has a negative refractive power. For example, the second lens system may include six lenses having refractive power, i.e., a first lens, a second lens, a third lens, a fourth lens, a fifth lens, and a sixth lens. The six lenses are sequentially arranged from the object side to an image side along an optical axis. The lens closest to the object side (that is, the first lens) of the second lens system having a negative refractive power may increase the angle of view of the second lens system, smooth the incident angle of the light on the second lens, and reduce the aperture of the subsequent lens at the same time, which helps to maintain the miniaturization of the lens assembly.

In an exemplary embodiment, an image-side surface of the second lens in the second lens system may be a convex surface. The convex image-side surface of the second lens of the second lens system is beneficial to reduce the edge distortion of the second lens system, and improve the relative brightness at the edge of the second lens system.

In an exemplary embodiment, an image-side surface of the third lens in the second lens system may be a convex surface.

In an exemplary embodiment, the fifth lens in the second lens system may have a positive refractive power, an object-side surface thereof may be a concave surface, and an image-side surface thereof may be a convex surface. The fifth lens of the second lens system has a positive refractive power, which can effectively correct and compensate the aberrations generated by the first lens to the fourth lens. Designing the object-side surface of the fifth lens of the second lens system as a concave surface helps to correct chromatic aberration through the lens thickness at different aperture heights. Further, by configuring the image-side surface of the fifth lens of the second lens system as a convex surface, the light may be effectively diffused and the second lens system may have a large image surface.

In an exemplary embodiment, an object-side surface of the sixth lens in the second lens system may be a convex surface, an image-side surface of the sixth lens in the second lens system may be a concave surface.

In an exemplary embodiment, the electronic imaging device according to the present disclosure may satisfy: $0.4 \leq f_W/f5_W \leq 1.8$, where $f_W$ is a total effective focal length of the second lens system and $f5_W$ is an effective focal length of the fifth lens of the second lens system. More specifically, $f_W$ and $f5_W$ may further satisfy: $0.40 \leq f_W/f5_W \leq 1.79$. When the conditional expression of $0.4 \leq f_W/f5_W \leq 1.8$ is satisfied, the optical distortion of the second lens system may be reduced, and the refractive ability of the fifth lens of the second lens system may be improved, and the second lens system may better match the chip's chief ray angle (CRA).

In an exemplary embodiment, the electronic imaging device according to the present disclosure may satisfy: $0.2 < R2_W/R1_W < 0.6$, where $R2_W$ is a radius of curvature of an image-side surface of the first lens of the second lens system and $R1_W$ is a radius of curvature of an object-side surface of the first lens of the second lens system. More specifically, $R2_W$ and $R1_W$ may further satisfy: $0.3 \leq R2_W/R1_W \leq 0.50$. When the conditional expression $0.2 < R2_W/R1_W < 0.6$ is satisfied, the curvature of the first lens of the second lens system may be optimized, the second lens system may easily compensate field curvature and distortion, and the second lens system may obtain a larger field-of-view. Optionally, the object-side surface of the first lens of the second lens system may be a convex surface, and the image-side surface of the first lens of the second lens system may be a concave surface.

In an exemplary embodiment, the electronic imaging device according to the present disclosure may satisfy: $0.3 < R8_W/R7_W < 1.0$, where $R8_W$ is a radius of curvature of an image-side surface of the fourth lens of the second lens system and $R7_W$ is a radius of curvature of an object-side surface of the fourth lens in the second lens system. More specifically, $R8_W$ and $R7_W$ may further satisfy: $0.40 \leq R8_W/R7_W \leq 0.96$. When the conditional expression of $0.3 < R8_W/R7_W < 1.0$ is satisfied, the curvature of the fourth lens of the second lens system may be optimized to compensate the major aberrations, shrink the paraxial light, and increase the MTF value at the on-axis field of view, thereby improving the imaging quality. Optionally, the object-side surface of the fourth lens of the second lens system may be a convex surface, and the image-side surface of the fourth lens of the second lens system may be a concave surface.

In an exemplary embodiment, the electronic imaging device according to the present disclosure may satisfy: $TTL_W/ImgH_W < 1.9$, where $TTL_W$ is a distance along the optical axis of the second lens system from an object-side surface of the first lens of the second lens system to an imaging plane of the second lens system and $ImgH_W$ is half of a diagonal length of an effective pixel area on the imaging plane of the second lens system. More specifically, $TTL_W$ and $ImgH_W$ may further satisfy: $1.8 < TTL_W/ImgH_W < 1.9$, for example, $1.86 \leq TTL_W/ImgH_W \leq 1.88$. When the conditional $TTL_W/ImgH_W < 1.9$ is satisfied, the size of the second lens system may be effectively compressed, and the compact size characteristics of the lens assembly may be guaranteed.

In an exemplary embodiment, the electronic imaging device according to the present disclosure may satisfy: $f_W/EPD_W < 2.2$, where $f_W$ is a total effective focal length of the second lens system and $EPD_W$ is an entrance pupil aperture of the second lens system. More specifically, $f_W$ and $EPD_W$ may further satisfy: $f_W/EPD_W = 2.19$, for example. When the conditional expression $f_W/EPD_W < 2.2$ is satisfied, the second lens system may have a large aperture advantage, the imaging effect of the second lens system in a weak light environment is enhanced, and the aberration at the edge field of view may be reduced.

In an exemplary embodiment, at least four lenses among the first lens to the sixth lens in the second lens system may be made of plastic material. On the basis of considering imaging quality, the use of more plastic materials is conducive to the formation and processing of the lens, reduce processing errors, control system costs, and is conducive to mass production.

In an exemplary embodiment, each two adjacent lenses in the second lens system may have an air gap therebetween. A certain amount of air gap between adjacent lenses may ensure that adjacent lenses will not contact each other within the processing tolerances of the lenses, thereby avoiding lens wear or fracturing.

In an exemplary embodiment, the second lens system described above may further include at least one stop. The stop may be disposed at an appropriate position as needed, for example, between the first lens and the second lens. Optionally, the above second lens system may further include an optical filter for correcting the color deviation and/or a protective glass for protecting the photosensitive element on an imaging plane.

The second lens system according to the above embodiments of the present disclosure may employ a plurality of lenses, such as six lenses as described above. By properly assigning the refractive power of each lens, the surface shape, the center thickness of each lens, and spaced distances on the optical axis between the lenses, the size and the sensitivity of the second lens system may be effectively reduced, and the workability of the second lens system may be improved, such that the second lens system is more advantageous for production processing and may be applied to portable electronic imaging devices.

In the embodiments of the present disclosure, at least one of the surfaces of each lens in the second lens system is aspheric, that is, at least one of an object-side surface and an image-side surface of each lens of the first lens, the second lens, the third lens, the fourth lens, the fifth lens, and the sixth lens is aspheric. Optionally, all of the object-side surface and the image-side surface of each lens of the first lens, the second lens, the third lens, the fourth lens, the fifth lens, and the sixth lens of the second lens system are aspheric.

Examples of the second lens system according to the present disclosure will be further described below with reference to FIGS. 9 to 16D.

Example 5

Figure 9:
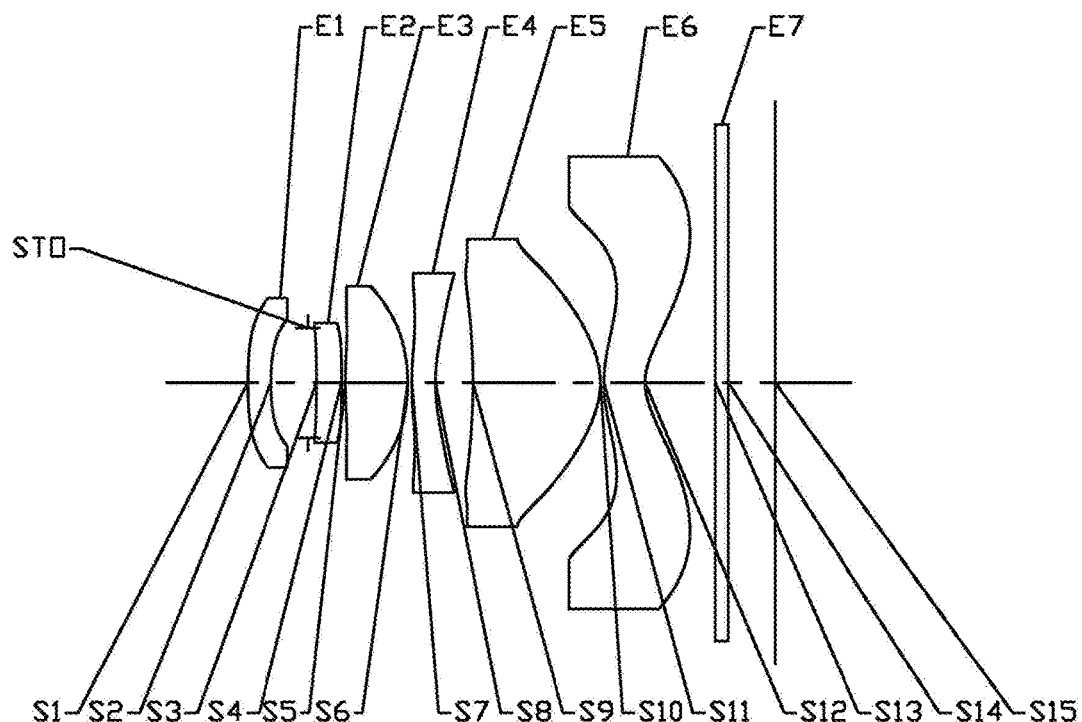
FIG. 9 illustrates a schematic structural view of a second lens system according to Example 5 of the present disclosure.

A second lens system according to example 5 of the present disclosure is described below with reference to FIG. 9 to FIG. 10D. FIG. 9 shows a schematic structural view of the second lens system according to example 5 of the present disclosure.

As shown in FIG. 9, the second lens system includes a first lens E1, a stop STO, a second lens E2, a third lens E3, a fourth lens E4, a fifth lens E5, a sixth lens E6, an optical filter E7 and an imaging plane S15, sequentially from an object side to an image side along an optical axis.

The first lens E1 has a negative refractive power. An object-side surface S1 of the first lens E1 is a convex surface, and an image-side surface S2 of the first lens E1 is a concave surface. The second lens E2 has a negative refractive power. An object-side surface S3 of the second lens E2 is a concave surface, and an image-side surface S4 of the second lens E2 is a convex surface. The third lens E3 has a positive refractive power. An object-side surface S5 of the third lens E3 is a convex surface, and an image-side surface S6 of the third lens E3 is a convex surface. The fourth lens E4 has a negative refractive power. An object-side surface S7 of the fourth lens E4 is a convex surface, and an image-side surface S8 of the fourth lens E4 is a concave surface. The fifth lens E5 has a positive refractive power. An object-side surface S9 of the fifth lens E5 is a concave surface, and an image-side surface S10 of the fifth lens E5 is a convex surface. The sixth lens E6 has a negative refractive power. An object-side surface S11 of the sixth lens E6 is a convex surface, and an image-side surface S12 of the sixth lens E6 is a concave surface. The optical filter E7 has an object-side surface S13 and an image-side surface S14. Light from an object sequentially passes through the respective surfaces S1 to S14 and is finally imaged on the imaging plane 515. In this example, the first lens E1 to the sixth lens E6 may be lenses made of plastic material.

Table 9 shows a basic parameter table of the second lens system in example 5, wherein the units for the radius of curvature, the thickness and the focal length are millimeter (mm). Table 10 shows high-order coefficients applicable to each aspheric surface in example 5, wherein the surface shape of each aspheric surface may be defined by the formula (1) given in the above example 1.

according to example 5, representing amounts of distortion at different field-of-views. FIG. 10D illustrates a lateral color curve of the second lens system according to example 5, representing deviations of different image heights on an imaging plane after light passes through the lens assembly. It can be seen from FIG. 10A to FIG. 10D that the second lens system provided in example 5 may achieve good image quality.

TABLE 9

Example 5: $f_W$ = 1.99 mm, $TTL_W$ = 4.50 mm, $ImgH_W$ = 2.41 mm, Semi-FOV$_W$ = 52.3°

| Surface number | Surface type | Radius of curvature | Thickness | Refractive index | Abbe number | Material | Focal length | Conic coefficient |
|---|---|---|---|---|---|---|---|---|
| OBJ | spherical | infinite | 500.0000 | | | | | |
| S1 | aspheric | 5.5063 | 0.2000 | 1.55 | 56.1 | plastic | −7.79 | −0.8300 |
| S2 | aspheric | 2.3695 | 0.3159 | | | | | −1.0365 |
| STO | spherical | infinite | 0.0734 | | | | | |
| S3 | aspheric | −11.9034 | 0.2129 | 1.55 | 56.1 | plastic | −588.18 | 99.0000 |
| S4 | aspheric | −12.4392 | 0.0326 | | | | | 99.0000 |
| S5 | aspheric | 5.1898 | 0.5313 | 1.55 | 56.1 | plastic | 1.99 | −99.0000 |
| S6 | aspheric | −1.3274 | 0.0344 | | | | | 0.2514 |
| S7 | aspheric | 2.8981 | 0.2000 | 1.67 | 20.4 | plastic | −4.83 | −64.3604 |
| S8 | aspheric | 1.4841 | 0.3200 | | | | | −11.1471 |
| S9 | aspheric | −5.3498 | 1.0904 | 1.55 | 56.1 | plastic | 1.34 | −22.6930 |
| S10 | aspheric | −0.6891 | 0.0300 | | | | | −3.8060 |
| S11 | aspheric | 1.2001 | 0.3500 | 1.65 | 23.5 | plastic | −1.60 | −8.3018 |
| S12 | aspheric | 0.4912 | 0.5975 | | | | | −3.4894 |
| S13 | spherical | infinite | 0.1100 | 1.52 | 64.2 | glass | | |
| S14 | spherical | infinite | 0.4000 | | | | | |
| S15 | spherical | infinite | | | | | | |

Here, $f_W$ is a total effective focal length of the second lens system, $TTL_W$ is a distance along the optical axis of the second lens system from the object-side surface S1 of the first lens E1 of the second lens system to the imaging plane S15 of the second lens system, $ImgH_W$ is half of a diagonal length of an effective pixel area on the imaging plane S15 of the second lens system, and Semi-FOV$_T$ is half of a maximal field-of-view of the second lens system.

Example 6

Figure 11:
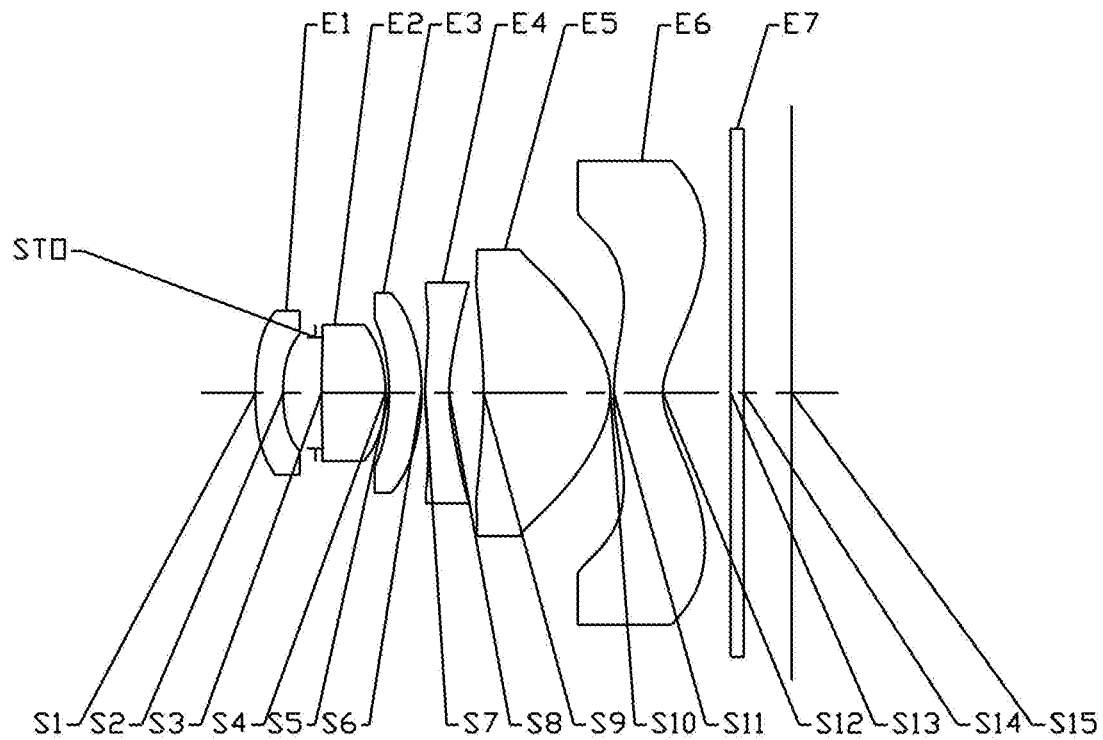
FIG. 11 illustrates a schematic structural view of a second lens system according to Example 6 of the present disclosure.

A second lens system according to example 6 of the present disclosure is described below with reference to FIG. 11 to FIG. 12D. FIG. 11 shows a schematic structural view of the second lens system according to example 6 of the present disclosure.

TABLE 10

| Surface number | A4 | A6 | A8 | A10 | A12 | A14 | A16 | A18 | A20 |
|---|---|---|---|---|---|---|---|---|---|
| S1 | 5.4435E−01 | −7.6902E−01 | 4.4887E+00 | −2.3375E+01 | 8.5487E+01 | −1.9711E+02 | 2.7343E+02 | −2.0671E+02 | 6.4785E+01 |
| S2 | 9.0867E−01 | −3.1443E+00 | 4.5817E+01 | −4.0839E+02 | 2.3283E+03 | −8.1653E+03 | 1.6980E+04 | −1.8837E+04 | 8.3864E+03 |
| S3 | −1.1352E−02 | −8.4646E−01 | 2.6268E+00 | −4.7747E+01 | 5.7529E+02 | −3.5383E+03 | 1.1442E+04 | −1.8250E+04 | 1.1301E+04 |
| S4 | 2.0082E−01 | −6.4434E+00 | 3.5422E+01 | −1.6339E+02 | 6.2954E+02 | −1.4978E+03 | 1.4806E+03 | 6.9119E+02 | −1.7659E+03 |
| S5 | 4.1001E−01 | −5.9762E+00 | 3.1068E+01 | −1.3937E+02 | 5.4351E+02 | −1.4321E+03 | 2.2607E+03 | −1.9341E+03 | 6.9136E+02 |
| S6 | 2.4015E−01 | −7.6926E−01 | −6.5678E+00 | 4.6908E+01 | −1.4427E+02 | 2.6767E+02 | −3.0617E+02 | 1.9535E+02 | −5.2494E+01 |
| S7 | 3.6458E−01 | −5.2828E−01 | −3.7058E+00 | 2.0771E+01 | −3.8891E+01 | 3.0573E+01 | −3.0739E+00 | −9.1068E+00 | 3.7496E+00 |
| S8 | −1.2516E−01 | 8.3790E−01 | −5.2405E+00 | 1.6313E+01 | −2.7884E+01 | 2.8407E+01 | −1.7457E+01 | 6.0445E+00 | −9.1860E−01 |
| S9 | 4.1197E−02 | −1.2020E−01 | −1.2263E−01 | 1.8495E+00 | −6.2113E+00 | 1.0459E+01 | −9.3324E+00 | 4.2328E+00 | −7.7343E−01 |
| S10 | −2.4302E−01 | 3.9499E−01 | −1.1703E+00 | 2.8122E+00 | −4.4827E+00 | 4.5693E+00 | −2.8781E+00 | 1.0226E+00 | −1.5541E−01 |
| S11 | −1.3085E−01 | −1.0954E−01 | 5.5772E−02 | 2.4917E−01 | −5.0760E−01 | 4.4187E−01 | −2.0721E−01 | 5.1402E−02 | −5.2889E−03 |
| S12 | −1.6712E−01 | 4.0358E−02 | 5.8398E−02 | −8.6606E−02 | 5.6456E−02 | −2.1456E−02 | 4.8842E−03 | −6.2008E−04 | 3.3923E−05 |

Figures 10A, 10B:
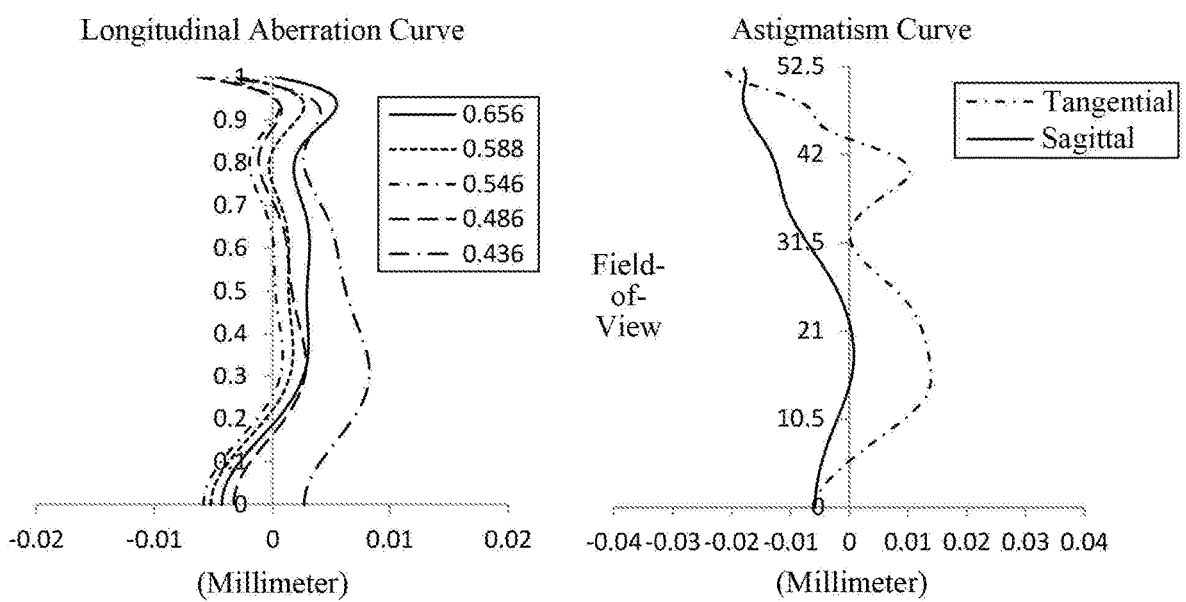
FIGS. 10A to 10D illustrate a longitudinal aberration curve, an astigmatic curve, a distortion curve and a lateral color curve of the second lens system of the Example 5, respectively.
Figure 10C:
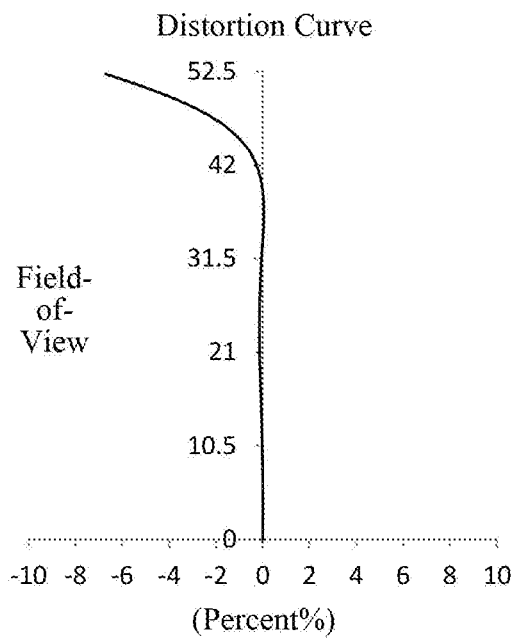
Figure 10D:
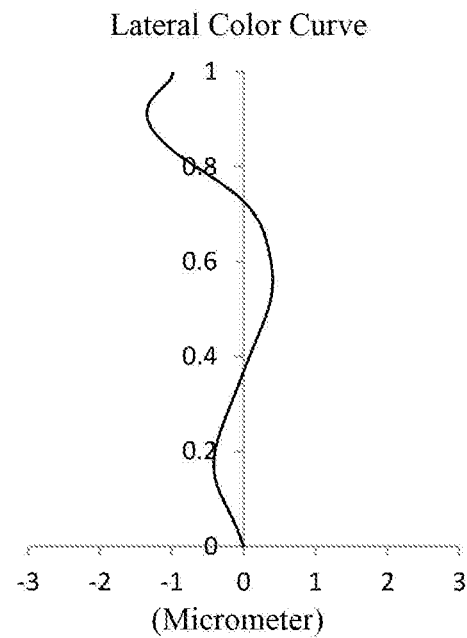

FIG. 10A illustrates a longitudinal aberration curve of the second lens system according to example 5, representing deviations of focal points converged by light of different wavelengths after passing through the lens assembly. FIG. 10B illustrates an astigmatism curve of the second lens system according to example 5, representing a curvature of a tangential plane and a curvature of a sagittal plane. FIG. 10C illustrates a distortion curve of the second lens system As shown in FIG. 11, the second lens system includes a first lens E1, a stop STO, a second lens E2, a third lens E3, a fourth lens E4, a fifth lens E5, a sixth lens E6, an optical filter E7 and an imaging plane S15, sequentially from an object side to an image side along an optical axis.

The first lens E1 has a negative refractive power. An object-side surface S1 of the first lens E1 is a convex surface, and an image-side surface S2 of the first lens E1 is a concave surface. The second lens E2 has a positive refractive power. An object-side surface S3 of the second lens E2 is a convex surface, and an image-side surface S4 of the second lens E2 is a convex surface. The third lens E3 has a negative refractive power. An object-side surface S5 of the third lens E3 is a concave surface, and an image-side surface S6 of the third lens E3 is a convex surface. The fourth lens E4 has a negative refractive power. An object-side surface S7 of the fourth lens E4 is a convex surface, and an image-side surface S8 of the fourth lens E4 is a concave surface. The fifth lens E5 has a positive refractive power. An object-side surface S9 of the fifth lens E5 is a concave surface, and an image-side surface S10 of the fifth lens E5 is a convex surface. The sixth lens E6 has a negative refractive power. An object-side surface S11 of the sixth lens E6 is a convex surface, and an image-side surface S12 of the sixth lens E6 is a concave surface. The optical filter E7 has an object-side surface S13 and an image-side surface S14. Light from an object sequentially passes through the respective surfaces S1 to S14 and is finally imaged on the imaging plane S15. In this example, the first lens E1 to the sixth lens E6 may be lenses made of plastic material.

Table 11 shows a basic parameter table of the second lens system in example 6, wherein the units for the radius of curvature, the thickness and the focal length are millimeter (mm). Table 12 shows high-order coefficients applicable to each aspheric surface in example 6, wherein the surface shape of each aspheric surface may be defined by the formula (1) given in the above example 1.

TABLE 11

Example 6: $f_W$ = 1.98 mm, $TTL_W$ = 4.49 mm, $ImgH_W$ = 2.41 mm, Semi-$FOV_W$ = 52.1°

| Surface number | Surface type | Radius of curvature | Thickness | Refractive index | Abbe number | Material | Focal length | Conic coefficient |
|---|---|---|---|---|---|---|---|---|
| OBJ | spherical | infinite | 500.0000 | | | | | |
| S1 | aspheric | 2.9097 | 0.2324 | 1.55 | 56.1 | plastic | −5.75 | −7.2177 |
| S2 | aspheric | 1.4679 | 0.2713 | | | | | 0.3162 |
| STO | spherical | infinite | 0.0505 | | | | | |
| S3 | aspheric | 8.1097 | 0.5355 | 1.55 | 56.1 | plastic | 1.87 | −97.8891 |
| S4 | aspheric | −1.1416 | 0.0300 | | | | | 0.6088 |
| S5 | aspheric | −1.6585 | 0.2719 | 1.55 | 56.1 | plastic | −500.40 | −2.9600 |
| S6 | aspheric | −1.7653 | 0.0300 | | | | | 0.7120 |
| S7 | aspheric | 2.3243 | 0.2000 | 1.67 | 20.4 | plastic | −5.58 | −74.5502 |
| S8 | aspheric | 1.3826 | 0.2883 | | | | | −11.2361 |
| S9 | aspheric | −4.0718 | 1.0603 | 1.55 | 56.1 | plastic | 1.27 | −49.3675 |
| S10 | aspheric | −0.6460 | 0.0300 | | | | | −3.4794 |
| S11 | aspheric | 1.5752 | 0.4103 | 1.65 | 23.5 | plastic | −1.52 | −9.1779 |
| S12 | aspheric | 0.5437 | 0.5665 | | | | | −4.1225 |
| S13 | spherical | infinite | 0.1100 | 1.52 | 64.2 | glass | | |
| S14 | spherical | infinite | 0.4000 | | | | | |
| S15 | spherical | infinite | | | | | | |

TABLE 12

| Surface number | A4 | A6 | A8 | A10 | A12 | A14 | A16 | A18 | A20 |
|---|---|---|---|---|---|---|---|---|---|
| S1 | 4.5692E−01 | −2.2390E−01 | −3.3064E−01 | 6.4406E+00 | −3.0008E+01 | 7.8737E+01 | −1.2130E+02 | 1.0389E+02 | −3.9358E+01 |
| S2 | 8.1730E−01 | −2.4023E+00 | 4.9767E+01 | −5.6709E+02 | 4.1736E+03 | −1.8946E+04 | 5.1758E+04 | −7.7072E+04 | 4.8064E+04 |
| S3 | −2.0830E−02 | −1.1740E+00 | 2.3890E+01 | −3.4175E+02 | 2.9962E+03 | −1.6516E+04 | 5.5220E+04 | −1.0205E+05 | 8.0309E+04 |
| S4 | 9.6683E−02 | −1.0748E+00 | 1.4183E+00 | −2.8737E+01 | 3.1653E+02 | −1.5396E+03 | 3.8832E+03 | −5.0602E+03 | 2.7463E+03 |
| S5 | 2.6893E−01 | −1.0409E+00 | −7.6131E+00 | 5.3704E+01 | −1.1480E+02 | −3.7305E+01 | 5.3751E+02 | −7.8690E+02 | 3.6777E+02 |
| S6 | −9.5685E−02 | 2.7388E+00 | −2.3848E+01 | 1.0199E+02 | −2.4975E+02 | 3.6044E+02 | −2.9824E+02 | 1.2674E+02 | −1.9850E+01 |
| S7 | −1.0405E−01 | −2.4986E−02 | −3.8517E+00 | 2.2389E+01 | −5.7310E+01 | 8.1943E+01 | −6.8770E+01 | 3.2326E+01 | −6.8616E+00 |
| S8 | −1.2869E−01 | 4.2753E−01 | −2.1849E+00 | 7.5182E+00 | −1.4812E+01 | 1.7539E+01 | −1.2421E+01 | 4.8513E+00 | −8.0562E−01 |
| S9 | 5.0143E−02 | −2.3685E−01 | 8.9591E−01 | −2.5538E+00 | 5.0760E+00 | −6.6336E+00 | 5.4303E+00 | −2.4769E+00 | 4.7351E−01 |
| S10 | −2.5933E−01 | 2.6130E−01 | −2.7831E−01 | 2.4627E−01 | −1.9167E−01 | 1.3230E−01 | −5.8436E−02 | 6.5903E−03 | 3.5647E−03 |
| S11 | −1.8737E−01 | 1.1285E−01 | −2.5708E−01 | 4.6634E−01 | −5.4579E−01 | 3.9930E−01 | −1.7738E−01 | 4.3594E−02 | −4.5007E−03 |
| S12 | −1.4827E−01 | 6.6642E−02 | −1.0587E−02 | −1.6257E−02 | 1.5505E−02 | −6.8324E−03 | 1.6938E−03 | −2.2751E−04 | 1.2964E−05 |

Figure 12A:
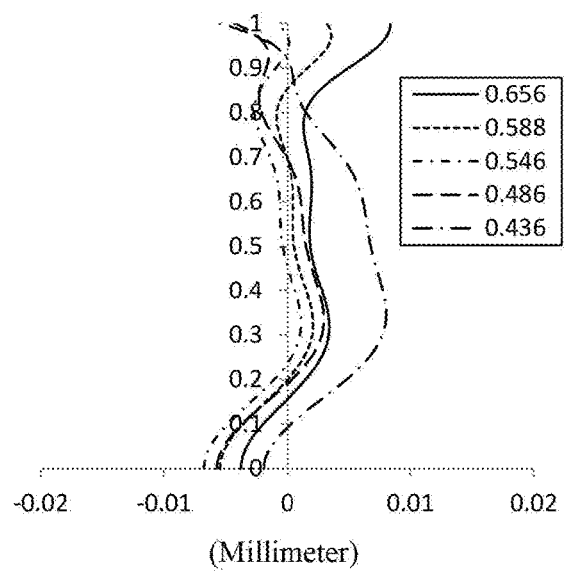
FIGS. 12A to 12D illustrate a longitudinal aberration curve, an astigmatic curve, a distortion curve and a lateral color curve of the second lens system of the Example 6, respectively.
Figure 12B:
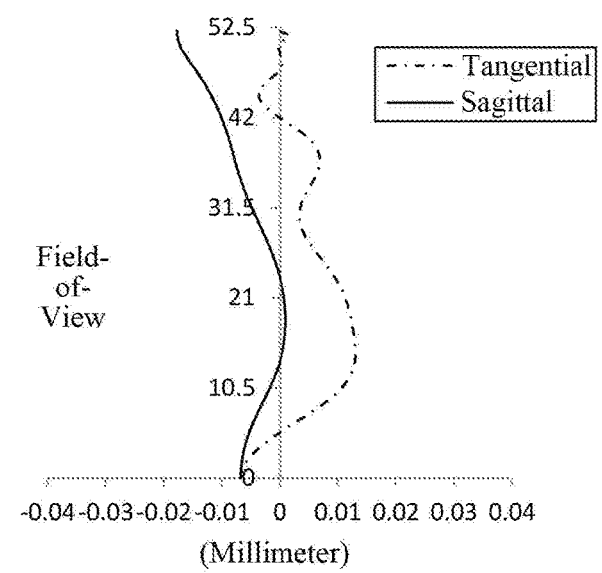
Figure 12C:
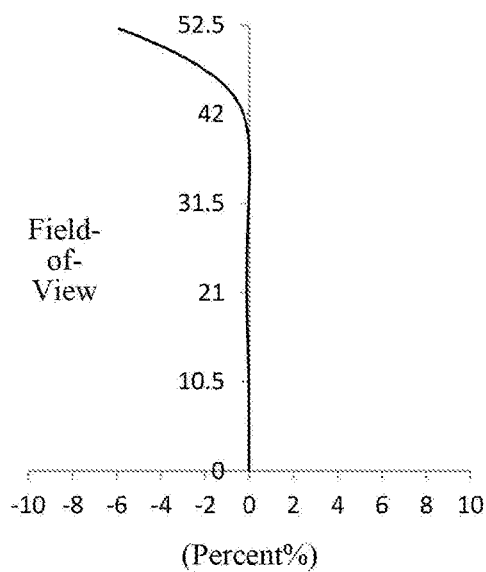
Figure 12D:
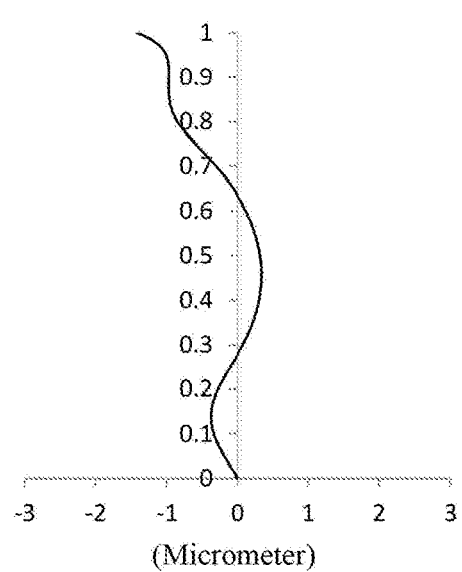

FIG. 12A illustrates a longitudinal aberration curve of the second lens system according to example 6, representing deviations of focal points converged by light of different wavelengths after passing through the lens assembly. FIG. 12B illustrates an astigmatism curve of the second lens system according to example 6, representing a curvature of a tangential plane and a curvature of a sagittal plane. FIG. 12C illustrates a distortion curve of the second lens system according to example 6, representing amounts of distortion at different field-of-views. FIG. 12D illustrates a lateral color curve of the second lens system according to example 6, representing deviations of different image heights on an imaging plane after light passes through the lens assembly. It can be seen from FIG. 12A to FIG. 12D that the second lens system provided in example 6 may achieve good image quality.

Example 7

Figure 13:
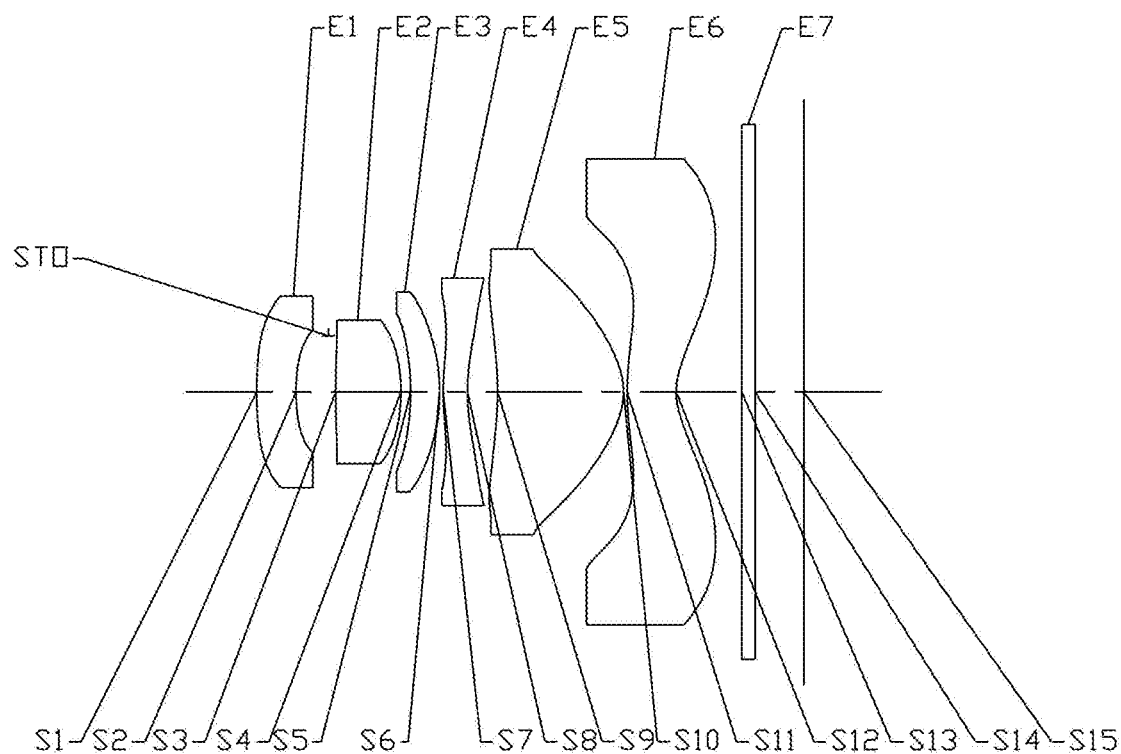
FIG. 13 illustrates a schematic structural view of a second lens system according to Example 7 of the present disclosure.

A second lens system according to example 7 of the present disclosure is described below with reference to FIG. 13 to FIG. 14D. FIG. 13 shows a schematic structural view of the second lens system according to example 7 of the present disclosure.

As shown in FIG. 13, the second lens system includes a first lens E1, a stop STO, a second lens E2, a third lens E3, a fourth lens E4, a fifth lens E5, a sixth lens E6, an optical filter E7 and an imaging plane S15, sequentially from an object side to an image side along an optical axis.

The first lens E1 has a negative refractive power. An object-side surface S1 of the first lens E1 is a convex surface, and an image-side surface S2 of the first lens E1 is a concave surface. The second lens E2 has a positive refractive power. An object-side surface S3 of the second lens E2 is a convex surface, and an image-side surface S4 of the second lens E2 is a convex surface. The third lens E3 has a positive refractive power. An object-side surface S5 of the third lens E3 is a concave surface, and an image-side surface S6 of the third lens E3 is a convex surface. The fourth lens E4 has a positive refractive power. An object-side surface S7 of the fourth lens E4 is a convex surface, and an image-side surface S8 of the fourth lens E4 is a concave surface. The fifth lens E5 has a positive refractive power. An object-side surface S9 of the fifth lens E5 is a concave surface, and an image-side surface S10 of the fifth lens E5 is a convex surface. The sixth lens E6 has a negative refractive power. An object-side surface S11 of the sixth lens E6 is a convex surface, and an image-side surface S12 of the sixth lens E6 is a concave surface. The optical filter E7 has an object-side surface S13 and an image-side surface S14. Light from an object sequentially passes through the respective surfaces S1 to S14 and is finally imaged on the imaging plane S15. In this example, the first lens E1 to the sixth lens E6 may be lenses made of plastic material.

Table 13 shows a basic parameter table of the second lens system in example 7, wherein the units for the radius of curvature, the thickness and the focal length are millimeter (mm). Table 14 shows high-order coefficients applicable to each aspheric surface in example 7, wherein the surface shape of each aspheric surface may be defined by the formula (1) given in the above example 1.

TABLE 13

Example 7: $f_{IV}$ = 1.95 mm, $TTL_{IV}$ = 4.50 mm, $ImgH_{IV}$ = 2.41 mm, Semi-$FOV_{IV}$ = 52.0°

| Surface number | Surface type | Radius of curvature | Thickness | Attribute | | | Focal length | Conic coefficient |
| | | | | Refractive index | Abbe number | Material | | |
| --- | --- | --- | --- | --- | --- | --- | --- | --- |
| OBJ | spherical | infinite | 500.0000 | | | | | |
| S1 | aspheric | 4.4438 | 0.3228 | 1.55 | 56.1 | plastic | −5.45 | −38.1578 |
| S2 | aspheric | 1.7372 | 0.2675 | | | | | 0.2141 |
| STO | spherical | infinite | 0.0582 | | | | | |
| S3 | aspheric | 7.8102 | 0.5366 | 1.55 | 56.1 | plastic | 2.27 | −99.0000 |
| S4 | aspheric | −1.4356 | 0.0800 | | | | | 1.4790 |
| S5 | aspheric | −1.8988 | 0.2369 | 1.55 | 56.1 | plastic | 1841.82 | −4.0422 |
| S6 | aspheric | −1.9788 | 0.0300 | | | | | 1.5348 |
| S7 | aspheric | 1.8732 | 0.2000 | 1.67 | 20.4 | plastic | 500.01 | −74.7673 |
| S8 | aspheric | 1.8032 | 0.2473 | | | | | −11.9677 |
| S9 | aspheric | −2.5577 | 1.0351 | 1.55 | 56.1 | plastic | 1.09 | −54.3527 |
| S10 | aspheric | −0.5523 | 0.0300 | | | | | −3.7326 |
| S11 | aspheric | 2.3575 | 0.4028 | 1.65 | 23.5 | plastic | −1.17 | −7.9039 |
| S12 | aspheric | 0.5332 | 0.5384 | | | | | −5.1149 |
| S13 | spherical | infinite | 0.1100 | 1.52 | 64.2 | glass | | |
| S14 | spherical | infinite | 0.4000 | | | | | |
| S15 | spherical | infinite | | | | | | |

TABLE 14

| Surface number | A4 | A6 | A8 | A10 | A12 | A14 | A16 | A18 | A20 |
| --- | --- | --- | --- | --- | --- | --- | --- | --- | --- |
| S1 | 3.9316E−01 | −1.6422E−01 | −4.0117E−01 | 4.6728E+00 | −1.9018E+01 | 4.5626E+01 | −6.5058E+01 | 5.1291E+01 | −1.7305E+01 |
| S2 | 7.5331E−01 | −9.7313E−01 | 1.9083E+01 | −1.3345E+02 | 2.8826E+02 | 2.7927E+03 | −2.1522E+04 | 5.8897E+04 | −5.8569E+04 |
| S3 | 4.4726E−02 | −2.4021E+00 | 5.3078E+01 | −7.3798E+02 | 6.3042E+03 | −3.3782E+04 | 1.0998E+05 | −1.9792E+05 | 1.5080E+05 |
| S4 | −1.3088E−01 | 8.2034E−01 | −7.7285E+00 | 1.3778E+01 | 4.8195E+00 | −3.0387E+00 | −1.5915E+02 | 3.4196E+02 | −1.8455E+02 |
| S5 | 2.4381E−02 | 1.8509E+00 | −1.4386E+01 | 4.9013E+01 | −1.5844E+02 | 4.7065E+02 | −8.9711E+02 | 9.1044E+02 | −3.7525E+02 |
| S6 | −1.2611E+00 | 1.0771E+01 | −5.5623E+01 | 2.0727E+02 | −5.7368E+02 | 1.1118E+03 | −1.3755E+03 | 9.5414E+02 | −2.7935E+02 |
| S7 | −4.1333E−02 | −2.3427E+00 | 1.1972E+01 | −3.4424E+01 | 5.9614E+01 | −5.4628E+01 | 1.3403E+01 | 1.5443E+01 | −9.6092E+00 |

TABLE 14-continued

| Surface number | A4 | A6 | A8 | A10 | A12 | A14 | A16 | A18 | A20 |
|---|---|---|---|---|---|---|---|---|---|
| S8 | 3.2079E−01 | −3.2708E+00 | 1.2669E+01 | −2.9817E+01 | 4.6455E+01 | −4.7598E+01 | 3.0692E+01 | −1.1286E+01 | 1.8039E+00 |
| S9 | −7.4686E−02 | 9.7234E−01 | −4.5594E+00 | 1.1238E+01 | −1.6044E+01 | 1.3717E+01 | −6.6800E+00 | 1.5736E+00 | −1.0405E−01 |
| S10 | −3.4933E−01 | 6.8566E−01 | −1.6470E+00 | 3.0550E+00 | −4.0165E+00 | 3.5008E+00 | −1.8439E+00 | 5.1081E−01 | −5.1912E−02 |
| S11 | −1.6067E−01 | 5.5390E−02 | −3.9379E−01 | 9.4453E−01 | −1.2447E+00 | 1.0036E+00 | −4.8874E−01 | 1.3080E−01 | −1.4628E−02 |
| S12 | −5.4392E−02 | −1.1681E−01 | 1.9594E−01 | −1.7160E−01 | 9.5232E−02 | −3.4078E−02 | 7.5816E−03 | −9.5307E−04 | 5.1774E−05 |

Figure 14A:
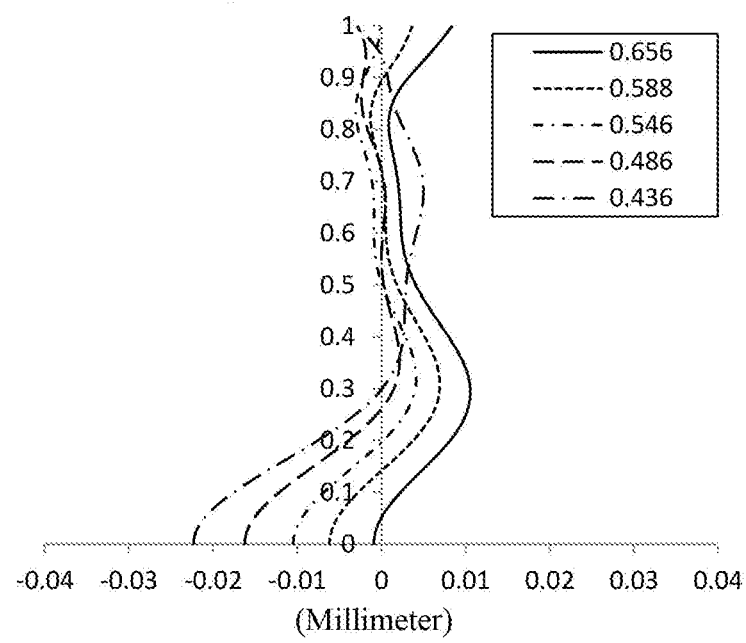

FIG. 14A illustrates a longitudinal aberration curve of the second lens system according to example 7, representing deviations of focal points converged by light of different wavelengths after passing through the lens assembly. FIG. 14B illustrates an astigmatism curve of the second lens system according to example 7, representing a curvature of a tangential plane and a curvature of a sagittal plane. FIG. 14C illustrates a distortion curve of the second lens system according to example 7, representing amounts of distortion at different field-of-views. FIG. 14D illustrates a lateral color curve of the second lens system according to example 7, representing deviations of different image heights on an imaging plane after light passes through the lens assembly. It can be seen from FIG. 14A to FIG. 14D that the second lens system provided in example 7 may achieve good image quality.

Example 8

Figure 15:
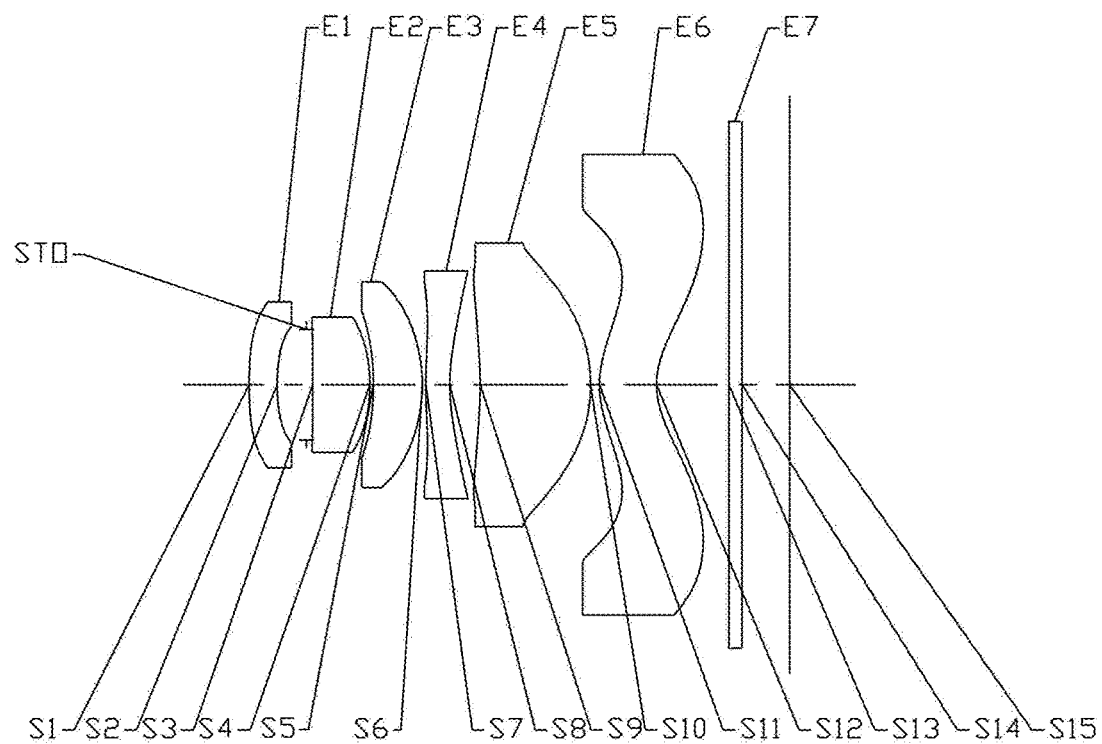
FIG. 15 illustrates a schematic structural view of a second lens system according to Example 8 of the present disclosure.

A second lens system according to example 8 of the present disclosure is described below with reference to FIG. 15 to FIG. 16D. FIG. 15 shows a schematic structural view of the second lens system according to example 8 of the present disclosure.

As shown in FIG. 15, the second lens system includes a first lens E1, a stop STO, a second lens E2, a third lens E3, a fourth lens E4, a fifth lens E5, a sixth lens E6, an optical filter E7 and an imaging plane S15, sequentially from an object side to an image side along an optical axis.

The first lens E1 has a negative refractive power. An object-side surface S1 of the first lens E1 is a convex surface, and an image-side surface S2 of the first lens E1 is a concave surface. The second lens E2 has a positive refractive power. An object-side surface S3 of the second lens E2 is a convex surface, and an image-side surface S4 of the second lens E2 is a convex surface. The third lens E3 has a positive refractive power. An object-side surface S5 of the third lens E3 is a concave surface, and an image-side surface S6 of the third lens E3 is a convex surface. The fourth lens E4 has a negative refractive power. An object-side surface S7 of the fourth lens E4 is a convex surface, and an image-side surface S8 of the fourth lens E4 is a concave surface. The fifth lens E5 has a positive refractive power. An object-side surface S9 of the fifth lens E5 is a concave surface, and an image-side surface S10 of the fifth lens E5 is a convex surface. The sixth lens E6 has a positive refractive power. An object-side surface S11 of the sixth lens E6 is a convex surface, and an image-side surface S12 of the sixth lens E6 is a concave surface. The optical filter E7 has an object-side surface S13 and an image-side surface S14. Light from an object sequentially passes through the respective surfaces S1 to S14 and is finally imaged on the imaging plane S15. In this example, the first lens E1 to the sixth lens E6 may be lenses made of plastic material.

Table 15 shows a basic parameter table of the second lens system in example 8, wherein the units for the radius of curvature, the thickness and the focal length are millimeter (mm). Table 16 shows high-order coefficients applicable to each aspheric surface in example 8, wherein the surface shape of each aspheric surface may be defined by the formula (1) given in the above example 1.

TABLE 15

Example 8: $f_W$ = 1.98 mm, $TTL_W$ = 4.53 mm, $ImgH_W$ = 2.41 mm, Semi-$FOV_W$ = 52.0°

| Surface number | Surface type | Radius of curvature | Thickness | Refractive index | Abbe number | Material | Focal length | Conic coefficient |
|---|---|---|---|---|---|---|---|---|
| OBJ | spherical | infinite | 500.0000 | | | | | |
| S1 | aspheric | 4.1508 | 0.2345 | 1.55 | 56.1 | plastic | −6.65 | 0.0056 |
| S2 | aspheric | 1.8993 | 0.2451 | | | | | 0.8145 |
| STO | spherical | infinite | 0.0523 | | | | | |
| S3 | aspheric | 167615.8000 | 0.4806 | 1.55 | 56.1 | plastic | 2.37 | −99.0000 |
| S4 | aspheric | −1.2948 | 0.0300 | | | | | 0.2417 |
| S5 | aspheric | −2.0740 | 0.4092 | 1.55 | 56.1 | plastic | 5.84 | −3.4289 |
| S6 | aspheric | −1.3450 | 0.0300 | | | | | 0.2000 |
| S7 | aspheric | 4.4131 | 0.2000 | 1.67 | 20.4 | plastic | −4.52 | −99.0000 |
| S8 | aspheric | 1.7604 | 0.2543 | | | | | −10.4781 |
| S9 | aspheric | −2.8646 | 0.9247 | 1.55 | 56.1 | plastic | 5.00 | −95.5569 |
| S10 | aspheric | −1.5579 | 0.0751 | | | | | −2.2188 |
| S11 | aspheric | 0.8215 | 0.4783 | 1.65 | 23.5 | plastic | 31.63 | −4.9895 |
| S12 | aspheric | 0.6604 | 0.6056 | | | | | −2.8761 |
| S13 | spherical | infinite | 0.1100 | 1.52 | 64.2 | glass | | |
| S14 | spherical | infinite | 0.4000 | | | | | |
| S15 | spherical | infinite | | | | | | |

TABLE 16

| Surface number | A4 | A6 | A8 | A10 | A12 | A14 | A16 | A18 | A20 |
|---|---|---|---|---|---|---|---|---|---|
| S1 | 4.3966E−01 | 1.6563E−01 | −4.6385E+00 | 3.4603E+01 | −1.4569E+02 | 3.8448E+02 | −6.2469E+02 | 5.7305E+02 | −2.2687E+02 |
| S2 | 7.7087E−01 | 1.2768E+00 | −4.2513E+01 | 7.6885E+02 | −7.7438E+03 | 4.7075E+04 | −1.6887E+05 | 3.2881E+05 | −2.6635E+05 |
| S3 | −2.2452E−02 | −1.3409E+00 | 2.7023E+01 | −3.9505E+02 | 3.6564E+03 | −2.1246E+04 | 7.4438E+04 | −1.4227E+05 | 1.1354E+05 |
| S4 | 4.6176E−02 | 3.6141E−01 | −1.7538E+01 | 1.2376E+02 | −5.1567E+02 | 1.6023E+03 | −3.7130E+03 | 5.2813E+03 | −3.2051E+03 |
| S5 | 7.7895E−02 | 2.8810E−01 | −1.2787E+01 | 5.5281E+01 | −4.2139E+02 | 1.2224E+03 | −1.3703E+03 | 5.5980E+02 |
| S6 | −4.5886E−02 | 1.7170E+00 | −1.2028E+01 | 3.8543E+01 | −6.6286E+01 | 6.3574E+01 | −3.6634E+01 | 1.5811E+01 | −4.7652E+00 |
| S7 | −2.1682E−01 | 8.1833E−01 | −5.3498E+00 | 1.9757E+01 | −4.1901E+01 | 5.4690E+01 | −4.5061E+01 | 2.2148E+01 | −5.0155E+00 |
| S8 | 3.9247E−02 | −8.9889E−01 | 3.5922E+00 | −8.5300E+00 | 1.4004E+01 | −1.5759E+01 | 1.1401E+01 | −4.6969E+00 | 8.2418E−01 |
| S9 | 7.1159E−02 | 1.4178E−01 | −2.1057E+00 | 7.0498E+00 | −1.2663E+01 | 1.3914E+01 | −9.2441E+00 | 3.4017E+00 | −5.3454E−01 |
| S10 | −8.7455E−01 | 3.8135E+00 | −1.1040E+01 | 2.0666E+01 | −2.5488E+01 | 2.0598E+01 | −1.0486E+01 | 3.0511E+00 | −3.8589E−01 |
| S11 | −2.2651E−01 | v9.2339E−01 | −3.2165E+00 | 5.5826E+00 | −5.7296E+00 | 3.6508E+00 | −1.4211E+00 | 3.0940E−01 | −2.8811E−02 |
| S12 | −1.5843E−02 | −3.6022E−01 | 5.4411E−01 | −4.3720E−01 | 2.1836E−01 | −6.9746E−02 | 1.3881E−02 | −1.5722E−03 | 7.7668E−05 |

Figure 16A:
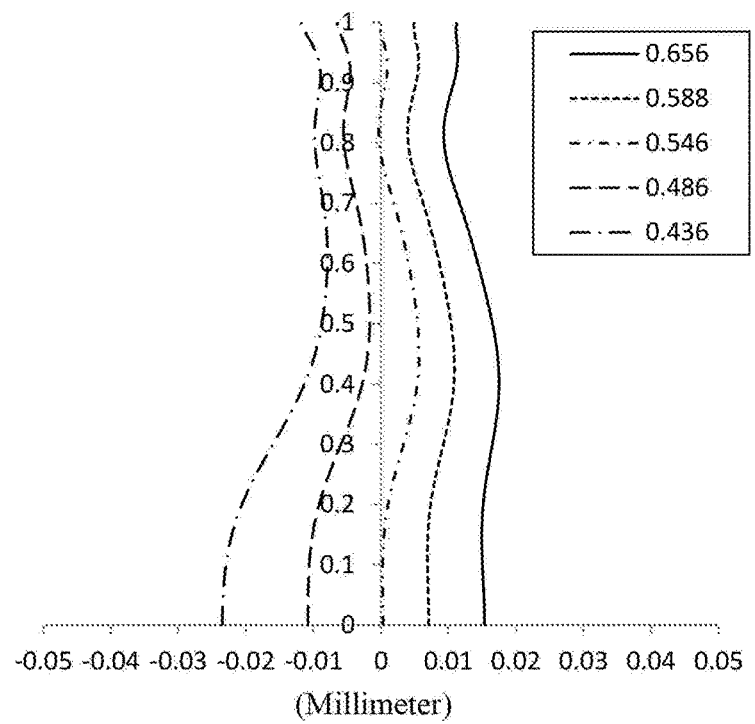
FIGS. 16A to 16D illustrate a longitudinal aberration curve, an astigmatic curve, a distortion curve and a lateral color curve of the second lens system of the Example 8, respectively.
Figure 16B:
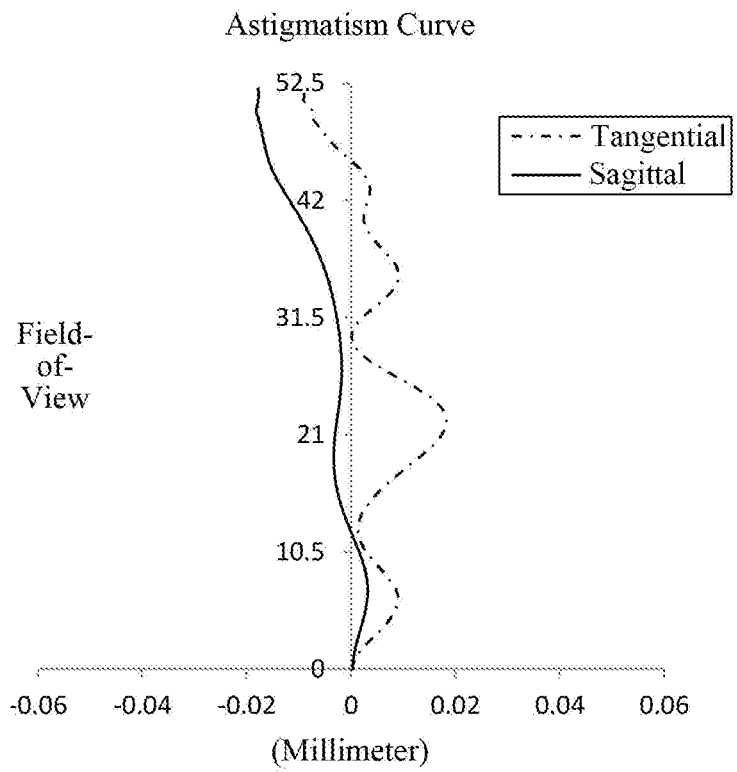
Figures 16C, 16D:
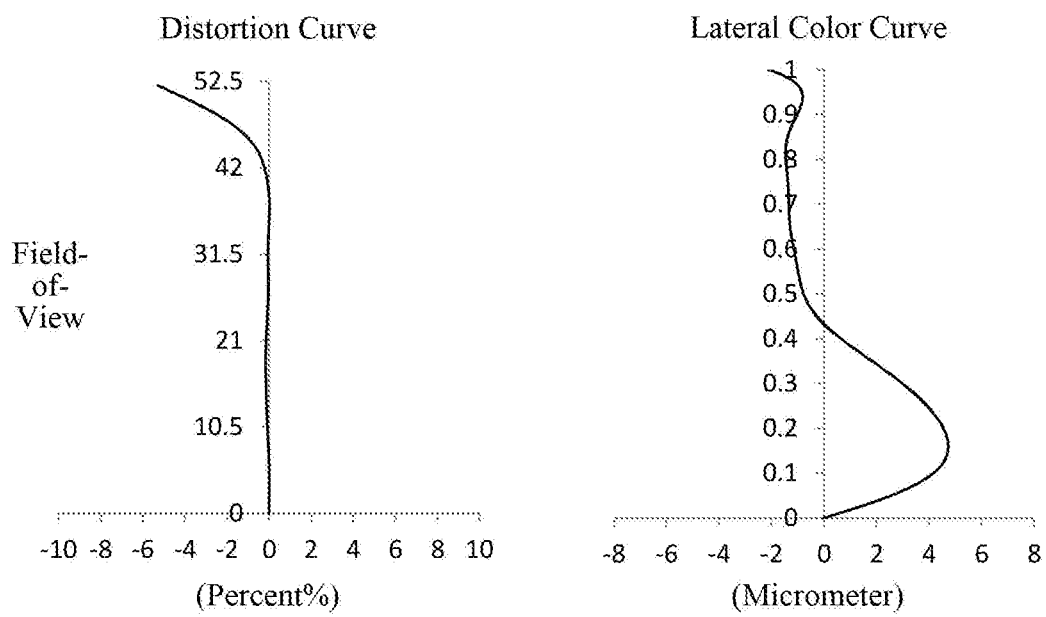

FIG. 16A illustrates a longitudinal aberration curve of the second lens system according to example 8, representing deviations of focal points converged by light of different wavelengths after passing through the lens assembly. FIG. 16B illustrates an astigmatism curve of the second lens system according to example 8, representing a curvature of a tangential plane and a curvature of a sagittal plane. FIG. 16C illustrates a distortion curve of the second lens system according to example 8, representing amounts of distortion at different field-of-views. FIG. 16D illustrates a lateral color curve of the second lens system according to example 8, representing deviations of different image heights on an imaging plane after light passes through the lens assembly. It can be seen from FIG. 16A to FIG. 16D that the second lens system provided in example 8 may achieve good image quality.

In view of the above, examples 1 to 8 respectively satisfy the relationship shown in Table 17.

TABLE 17

| Condition/Example | 1 | 2 | 3 | 4 | 5 | 6 | 7 | 8 |
|---|---|---|---|---|---|---|---|---|
| Semi-FOV$_T$ (°) | 20.8 | 21.3 | 21.0 | 20.8 | | | | |
| Semi-FOV$_W$ (°) | | | | | 52.3 | 52.1 | 52.0 | 52.0 |
| TTL$_T$/f$_T$ | 0.83 | 0.85 | 0.84 | 0.83 | | | | |
| (f2$_T$ + f5$_T$)/f4$_T$ | 0.63 | 0.46 | 0.50 | 0.65 | | | | |
| ImgH$_T$/f$_T$ | 0.39 | 0.40 | 0.39 | 0.39 | | | | |
| R11$_T$/R12$_T$ | 1.03 | 1.17 | 1.22 | 0.93 | | | | |
| f1234$_T$/(R1$_T$ + R2$_T$) | 0.41 | 0.44 | 0.43 | 0.42 | | | | |
| f$_W$/f5$_W$ | | | | | 1.49 | 1.56 | 1.79 | 0.40 |
| R2$_W$/R1$_W$ | | | | | 0.43 | 0.50 | 0.39 | 0.46 |
| R8$_W$/R7$_W$ | | | | | 0.51 | 0.59 | 0.96 | 0.40 |
| TTL$_W$/ImgH$_W$ | | | | | 1.87 | 1.86 | 1.87 | 1.88 |
| f$_W$/EPD$_W$ | | | | | 2.19 | 2.19 | 2.19 | 2.19 |

Although the first lens system and the second lens system are described above by including six lenses as an example, those skilled in the art should understand that without departing from the technical solution claimed in this disclosure, the number of lenses of the first lens system and/or the second lens system may be changed. If desired, the first lens system and the second lens system may further include other numbers of lenses. Meanwhile, without departing from the spirit and scope of the present disclosure, the various examples of the first lens system and the second lens system mentioned above may be arbitrarily combined to obtain the respective results and advantages described in this specification.

Similarly, although the electronic imaging device disclosed in this disclosure includes two capturing devices, it should be understood that the number of capturing devices mounted on the electronic imaging device is merely an example, and the disclosure should not be limited. If desired, the electronic imaging device may also include other numbers of capturing devices.

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An electronic imaging device, comprising:
a first capturing device including a first lens system and a first electronic photosensitive element located on an imaging plane of the first lens system, wherein the first lens system includes at least one lens having a refractive power, and in the first lens system, a lens of the lenses having refractive power, which is closest to an object side, has a positive refractive power; and
a second capturing device including a second lens system and a second electronic photosensitive element located on an imaging plane of the second lens system, wherein the second lens system includes at least one lens having a refractive power, and in the second lens system, a lens of the lenses having refractive power, which is closest to the object side, has a negative refractive power;
wherein, the first capturing device and the second capturing device are located at a same side of the electronic imaging device, and a field-of-view of the first capturing device is different from a field-of-view of the second capturing device,
wherein fT/fW>3.3, where fT is a total effective focal length of the first lens system and fW is a total effective focal length of the second lens system, and
wherein $f_W$/EPD$_W$<2.2, where EPD$_W$ is an entrance pupil aperture of the second lens system.

2. The electronic imaging device according to claim 1, wherein 20°<Semi-FOVT<25°,
where Semi-FOVT is half of a maximal field-of-view of the first lens system.

3. The electronic imaging device according to claim 1, wherein 50°<Semi-FOVW<55°, where Semi-FOVW is half of a maximal field-of-view of the second lens system.

4. The electronic imaging device according to claim 1, wherein TTLT/fT<0.9,
where TTLT is a distance along an optical axis of the first lens system from an object-side surface of the lens closest to the object side of the first lens system to the imaging plane of the first lens system, and fT is the total effective focal length of the first lens system.

5. The electronic imaging device according to claim 1, wherein ImgHT/fT<0.5,
where ImgHT is half of a diagonal length of an effective pixel area on the imaging plane of the first lens system and fT is the total effective focal length of the first lens system.

6. The electronic imaging device according to claim 1, wherein TTLW/ImgHW<1.9,
where TTLW is a distance along an optical axis of the second lens system from an object-side surface of the lens closest to the object side of the second lens system to the imaging plane of the second lens system, and ImgHW is half of a diagonal length of an effective pixel area on the imaging plane of the second lens system.

7. The electronic imaging device according to claim 1, wherein the first lens system includes, sequentially from the object side to the imaging plane of the first lens system along an optical axis of the first lens system, a first lens, a second lens, a third lens, a fourth lens, a fifth lens and a sixth lens.

8. The electronic imaging device according to claim 7, wherein 0.4<(f2T+f5T)/f4T<0.7,
where f2T is an effective focal length of the second lens of the first lens system, f5T is an effective focal length of the fifth lens of the first lens system, and f4T is an effective focal length of the fourth lens of the first lens system.

9. The electronic imaging device according to claim 7, wherein 0.8<R11T/R12T<1.3,
where R11T is a radius of curvature of an object-side surface of the sixth lens of the first lens system and R12T is a radius of curvature of an image-side surface of the sixth lens of the first lens system.

10. The electronic imaging device according to claim 7, wherein 0.3<f1234T/(R1T+R2T)<0.6,
where f1234T is a combined focal length of the first lens, the second lens, the third lens, and the fourth lens of the first lens system, R1T is a radius of curvature of an object-side surface of the first lens of the first lens system and R2T is a radius of curvature of an image-side surface of the first lens of the first lens system.

11. The electronic imaging device according to claim 7, wherein the fifth lens of the first lens system has a negative refractive power, an object-side surface thereof is a concave surface and an image-side surface thereof is a concave surface.

12. The electronic imaging device according to claim 7, wherein at least four lenses among the first lens to the sixth lens of the first lens system are lenses made of plastic material.

13. The electronic imaging device according to claim 1, wherein the second lens system includes, sequentially from the object side to the imaging plane of the second lens system along an optical axis of the second lens system, a first lens, a second lens, a third lens, a fourth lens, a fifth lens and a sixth lens.

14. The electronic imaging device according to claim 13, wherein 0.4≤fW/f5W≤1.8,
where fW is the total effective focal length of the second lens system and f5W is an effective focal length of the fifth lens of the second lens system.

15. The electronic imaging device according to claim 13, wherein 0.2<R2W/R1W<0.6,
where R2W is a radius of curvature of an image-side surface of the first lens of the second lens system and R1W is a radius of curvature of an object-side surface of the first lens of the second lens system.

16. The electronic imaging device according to claim 13, wherein 0.3<R8W/R7W<1.0,
where R8W is a radius of curvature of an image-side surface of the fourth lens of the second lens system, and R7W is a radius of curvature of an object-side surface of the fourth lens in the second lens system.

17. The electronic imaging device according to claim 13, wherein an image-side surface of the second lens of the second lens system is a convex surface, and
the fifth lens of the second lens system has a positive refractive power, an object-side surface thereof is a concave surface and an image-side surface thereof is a convex surface.

18. The electronic imaging device according to claim 13, wherein at least four lenses among the first lens to the sixth lens of the second lens system are lenses made of plastic material.

19. The electronic imaging device according to claim 1, wherein the first capturing device and the second capturing device are arranged longitudinally or laterally on one side of the electronic imaging device.

* * * * *